United States Patent
Flynn, IV et al.

(10) Patent No.: US 10,887,420 B2
(45) Date of Patent: Jan. 5, 2021

(54) PROFILE BASED CONTENT AND SERVICES

(71) Applicant: CONVIDA WIRELESS, LLC, Wilmington, DE (US)

(72) Inventors: William Robert Flynn, IV, Schwenksville, PA (US); Dale N. Seed, Allentown, PA (US); Quang Ly, North Wales, PA (US); Catalina Mihaela Mladin, Hatboro, PA (US); Zhuo Chen, Claymont, DE (US); Rocco Di Girolamo, Laval (CA); Shamim Akbar Rahman, Cote St. Luc (CA)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/339,390

(22) PCT Filed: Oct. 6, 2017

(86) PCT No.: PCT/US2017/055563
§ 371 (c)(1),
(2) Date: Apr. 4, 2019

(87) PCT Pub. No.: WO2018/067947
PCT Pub. Date: Apr. 12, 2018

(65) Prior Publication Data
US 2020/0045129 A1 Feb. 6, 2020

Related U.S. Application Data

(60) Provisional application No. 62/405,018, filed on Oct. 6, 2016.

(51) Int. Cl.
*H04L 29/08* (2006.01)
*H04W 4/50* (2018.01)
(Continued)

(52) U.S. Cl.
CPC ............. *H04L 67/30* (2013.01); *H04L 67/12* (2013.01); *H04L 67/16* (2013.01); *H04L 69/08* (2013.01); *H04W 4/50* (2018.02); *H04W 4/70* (2018.02)

(58) Field of Classification Search
CPC ......... H04L 67/30; H04L 67/12; H04L 67/16; H04L 69/08; H04L 67/2804; H04W 4/50; H04W 4/70
See application file for complete search history.

(56) References Cited

U.S. PATENT DOCUMENTS 10,021,549 B2 * 7/2018 Lu ........................... H04W 4/70
2014/0007076 A1 * 1/2014 Kim ....................... H04W 4/70
717/173
(Continued)

OTHER PUBLICATIONS

OneM2M TS-0001 V1.13.1, Technical Specification, "Functional Architecture" Feb. 29, 2016, 310 pages.
(Continued)

*Primary Examiner* — Pao Sinkantarakorn
*Assistant Examiner* — Kabir U Jahangir
(74) *Attorney, Agent, or Firm* — BakerHostetler

(57) ABSTRACT

Profile based services and content can assist with the backward and forward compatibility of conventional service layers or the like. Using a profile to manage content and access to services offered may reduce the overhead or processing associated with providing those value added services by service layers. A service layer may be an M2M/IoT Service Layer, and compatibility may refer to compatibility regarding different versions or releases of the oneM2M Service Layer.

20 Claims, 22 Drawing Sheets

(51) Int. Cl.
*H04L 29/06* (2006.01)
*H04W 4/70* (2018.01)

(56) References Cited

U.S. PATENT DOCUMENTS

| | | | |
|---|---|---|---|
| 2014/0215043 A1 | 7/2014 | Ryu et al. | |
| 2014/0359131 A1* | 12/2014 | Seed | H04L 67/12 |
| | | | 709/226 |
| 2015/0019717 A1* | 1/2015 | Li | H04L 67/1085 |
| | | | 709/224 |
| 2015/0055557 A1* | 2/2015 | Dong | H04W 4/70 |
| | | | 370/328 |
| 2016/0007138 A1* | 1/2016 | Palanisamy | H04W 4/50 |
| | | | 455/41.2 |
| 2016/0127312 A1* | 5/2016 | Foti | H04L 67/16 |
| | | | 709/223 |
| 2016/0277391 A1* | 9/2016 | Choyi | H04W 12/06 |

OTHER PUBLICATIONS

OneM2M TS-0001 V2.3.0, Technical Specification, "Functional Architecture", Aug. 2015, 352 pages.
OneM2M TS-0004 V-2014-08, Technical Specification, "oneM2M Service Layer Protocol Core Specification", Aug. 2014, 176 pages.
OneM2M TS-0009 V1.0.1 Technical Specification, "HTTP Protocol Binding TS", Jan. 2015, 13 pages.

* cited by examiner

PROFILE BASED CONTENT AND SERVICES

CROSS-REFERENCE TO RELATED APPLICATIONS

This application is the National Stage Application of International Patent Application No. PCT/US2017/055563 filed Oct. 6, 2017 which claims the benefit of U.S. Provisional Patent Application No. 62/405,018, filed Oct. 6, 2016, entitled "Profile Based Content and Services," the contents of which are hereby incorporated by reference herein.

BACKGROUND

An M2M/IoT Service Layer (SL) is a technology specifically targeted towards providing value-added services for M2M/IoT devices and applications. Recently, several industry standard bodies (e.g., oneM2M TS-0001 oneM2M Functional Architecture, V-2.7.0) have been developing M2M/IoT SLs to address the challenges associated with the integration of M2M/IoT devices and applications into deployments with the Internet/Web, cellular networks, enterprise networks, and home networks.

An M2M/IoT Service Layer (SL) can provide applications and devices access to a collection of M2M/IoT oriented capabilities. A few examples include security, charging, data management, device management, discovery, provisioning, and connectivity management. Sometimes these capabilities are made available to applications via RESTful APIs which make use of message formats, resource structures, and resource representations supported by the M2M/IoT Service Layer.

From a protocol stack perspective, M2M/IoT Service Layers are typically situated above the Application Protocol Layer and provide value added services to applications they support. Hence Service Layers are often categorized as 'middleware' services. FIG. 1 shows an exemplary service layer between the Application Protocols 101 and Applications 103.

The oneM2M standard TS-0001 oneM2M Functional Architecture, V-2.7.0 defines an M2M/IoT SL. The purpose of the oneM2M SL is to provide "horizontal" services that can be utilized by different "vertical" M2M systems and applications, such as e-Health, fleet management, and smart homes. The architecture of the oneM2M SL, as shown in FIG. 2, defines a Common Service Entity (CSE) that supports four reference points. The Mca reference point interfaces with the Application Entity (AE). The Mcc reference point interfaces with another CSE within the same service provider domain and the Mcc' reference point interfaces with another CSE in a different service provider domain. The Mcn reference point interfaces with the underlying network service entity (NSE). An NSE provides underlying network services to the CSEs, such as device management, location services and device triggering. A CSE contains multiple logical functions called "Common Service Functions (CSFs)", such as "Discovery", "Data Management & Repository". FIG. 3 illustrates the CSFs supported by the oneM2M SL.

oneM2M represents all entities, such as AEs, CSEs, and data as resources. In oneM2M TS-0001 oneM2M Functional Architecture, V-2.7.0, resource structures are specified for each of the oneM2M entities as well as procedures for accessing those resources. As oneM2M is in the early stages of development and deployment, some of the resource definitions are changing as new releases are completed. FIG. 4A and FIG. 4B shows an example for the definition of a <contentInstance> resource where release 2 of oneM2M Functional Architecture adds a new attribute called contentRef as well as the child resource <semanticDescriptor> compared to release 1 (TS-0001 oneM2M Functional Architecture, V-1.13.1).

oneM2M specifies that any received resource representation shall be validated against the oneM2M provided schema for that resource. oneM2M also specifies the characteristics of the attributes, such as Read Only, Write Once, Read/Write as well as whether the user can or must specify a value for the attribute. For example, Table 1 (oneM2M TS-0004 Service Layer Core Protocol, V-2.1.0) shows that it is Not Permitted "NP" to provide a value for resourceType during a CREATE or UPDATE request. If any of these conditions fail and "BAD REQUEST" response is returned. oneM2M allows some control of the information contained in a response using the Result Content request parameter to indicate what components of the requested operation to return, shown in Table 2.

TABLE 1

Container Common Attributes

| Attribute Name | Request Optionality | |
| --- | --- | --- |
| | Create | Update |
| resourceName | O | NP |
| resourceType | NP | NP |
| resourceID | NP | NP |
| parentID | NP | NP |
| accessControlPolicyIDs | O | O |
| creationTime | NP | NP |
| expirationTime | O | O |
| lastModifiedTime | NP | NP |
| stateTag | NP | NP |
| labels | O | O |
| announceTo | O | O |
| announcedAttribute | O | O |

TABLE 2

Result Content Values in Request

| Value |
| --- |
| attributes |
| hierarchical-address |
| hierarchical-address+attributes |
| attributes+child-resources |
| child-resources |
| attributes+child-resource-references |
| child-resource-references |
| nothing |
| original-resource |

SUMMARY

Methods, systems, and apparatuses, among other things may enhance the performance and functionality of conventional M2M service layers profile based services and content. Using a profile to manage content and access to services offered may reduce the overhead or processing associated with providing those value added services by the M2M service layers.

Described in more detail herein are the following: 1) the structure and properties of a <profile> resource that is applied to M2M service layer resources, attributes, and primitives to modify content and behavior of the message; 2)

procedures to define a system profile that can be specified by the system administrator to apply to one or more applications or devices; 3) procedures to define custom profiles that can be specified by an application or device to be applied to itself or to other applications or devices; 4) procedure to apply a stored profile to primitives from specified applications or devices; 5) procedure to link profiles together to implement advanced complex scenarios; 6) define a "profileTest" mode and procedures to test the outcome of linked profiles; and 7) procedure for profile search and matching to achieve better performance of M2M Service Layer messaging with profile support.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

In an IoT system, there may be devices (e.g., mobile device or sensors) deployed, applications deployed, and IoT Service Layers deployed to facilitate communication and management of those devices, sensors and applications. There are multiple requirements that should be considered in these deployments. Some of those sensors may be constrained devices that require small memory foot prints and low power usage. Some of those applications may not be able to use all of the features provided by the service layer. Some devices may have SW that is not able to be upgraded to use the latest version of the Service Layer functionality. The following use case demonstrates a number of issues that make meeting those constraints a challenge.

Figure 1:
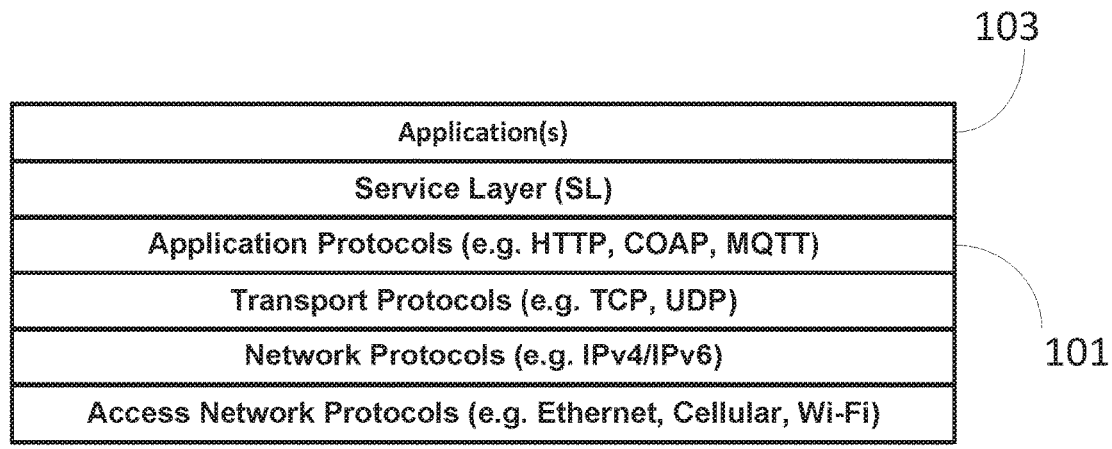
FIG. 1 illustrates an exemplary protocol stack supporting a service layer.
Figure 2:
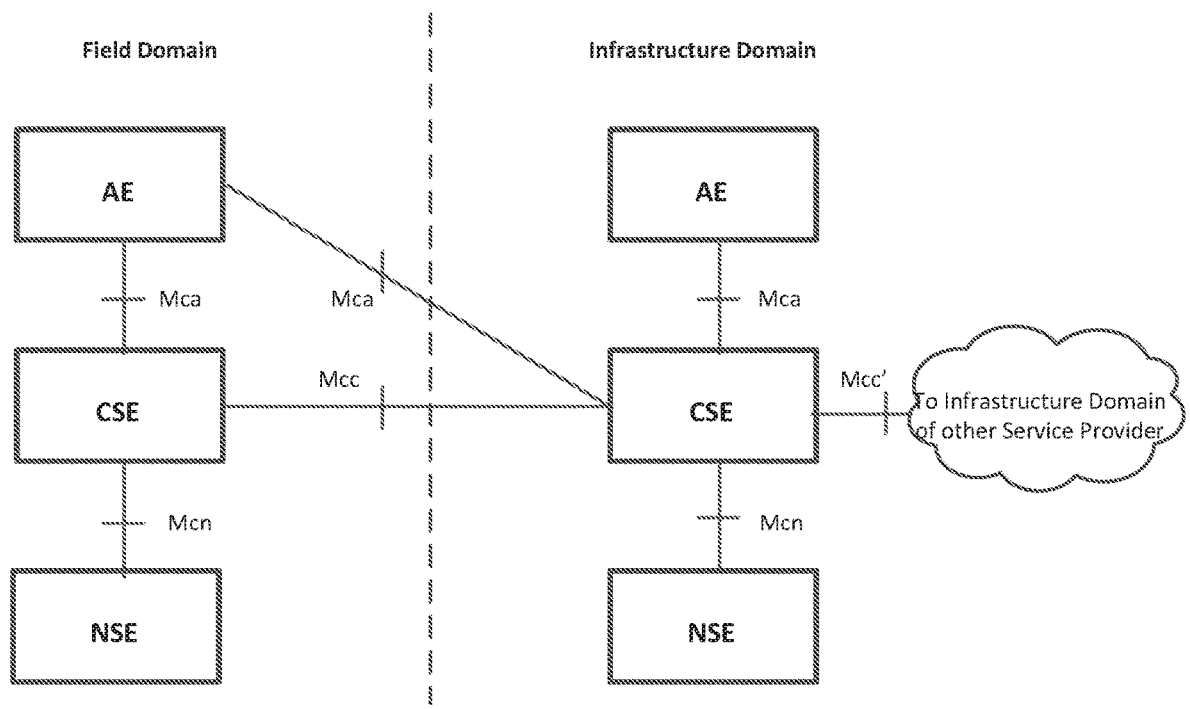
FIG. 2 illustrates an exemplary oneM2M Architecture.
Figure 3:
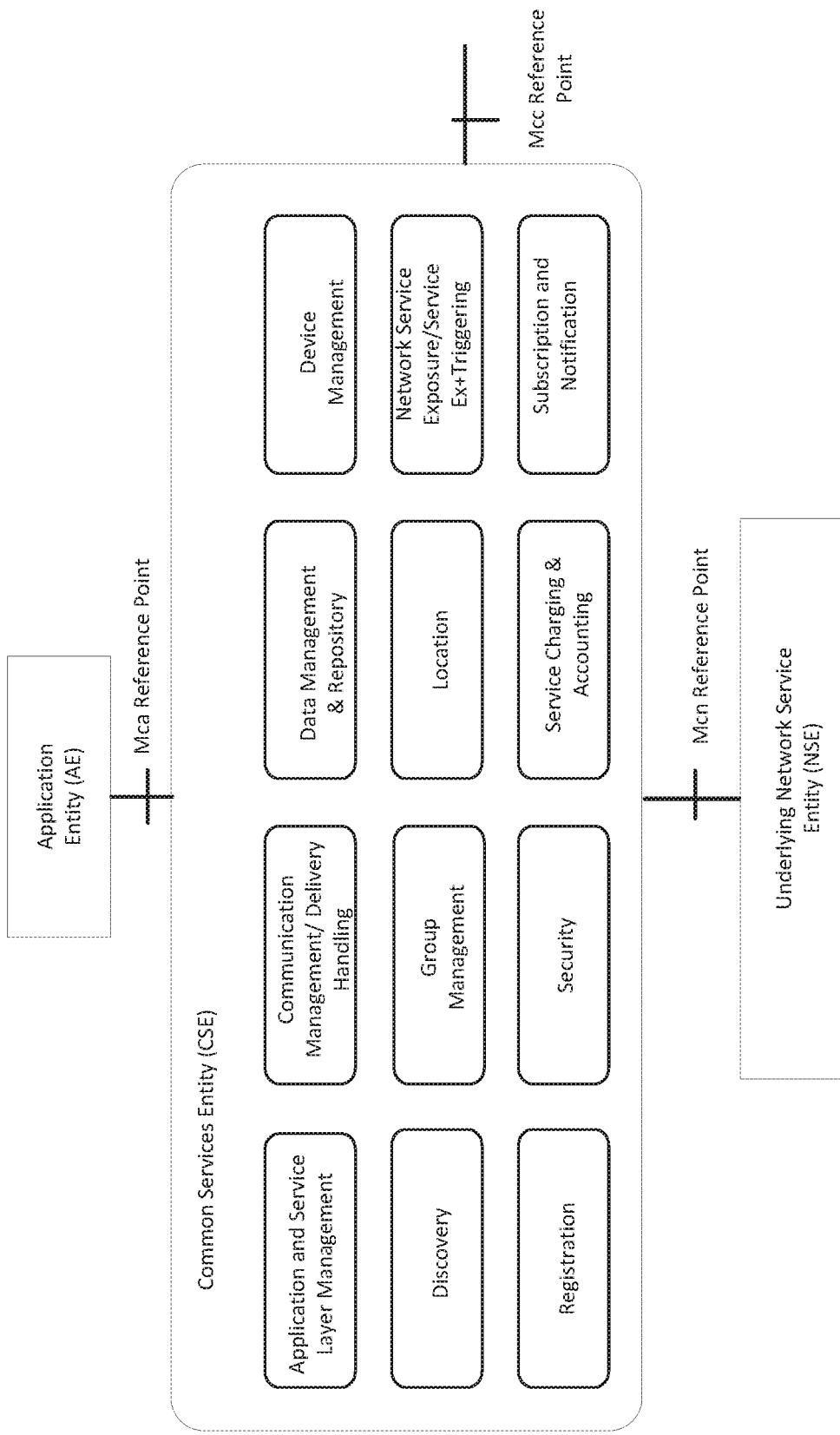
FIG. 3 illustrates exemplary oneM2M Common Service Functions.
Figure 4A:
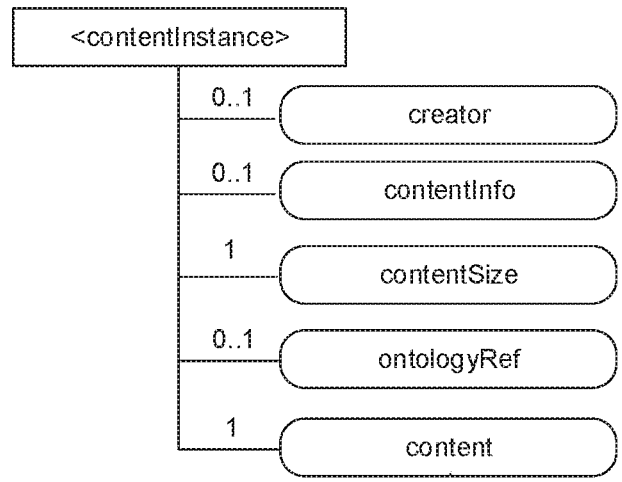
FIG. 4A illustrates exemplary ContentInstance resource definitions, Release 1.
Figure 4B:
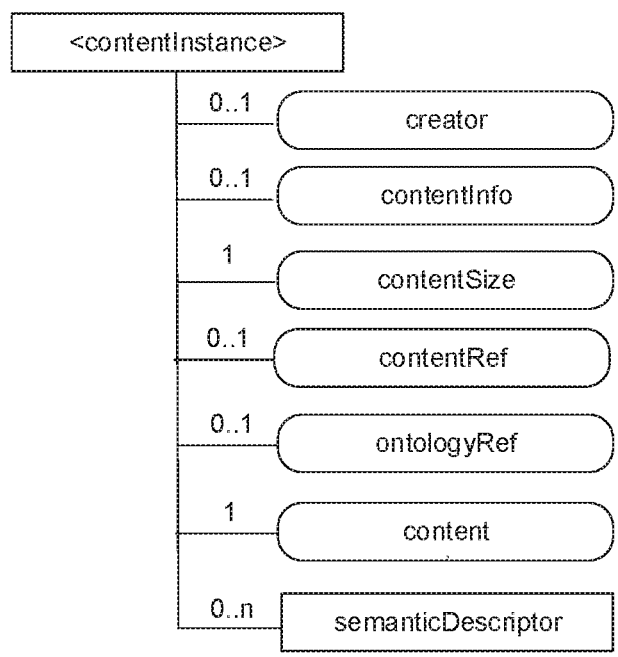
FIG. 4B illustrates exemplary ContentInstance resource definitions, Release 2.
Figure 5:
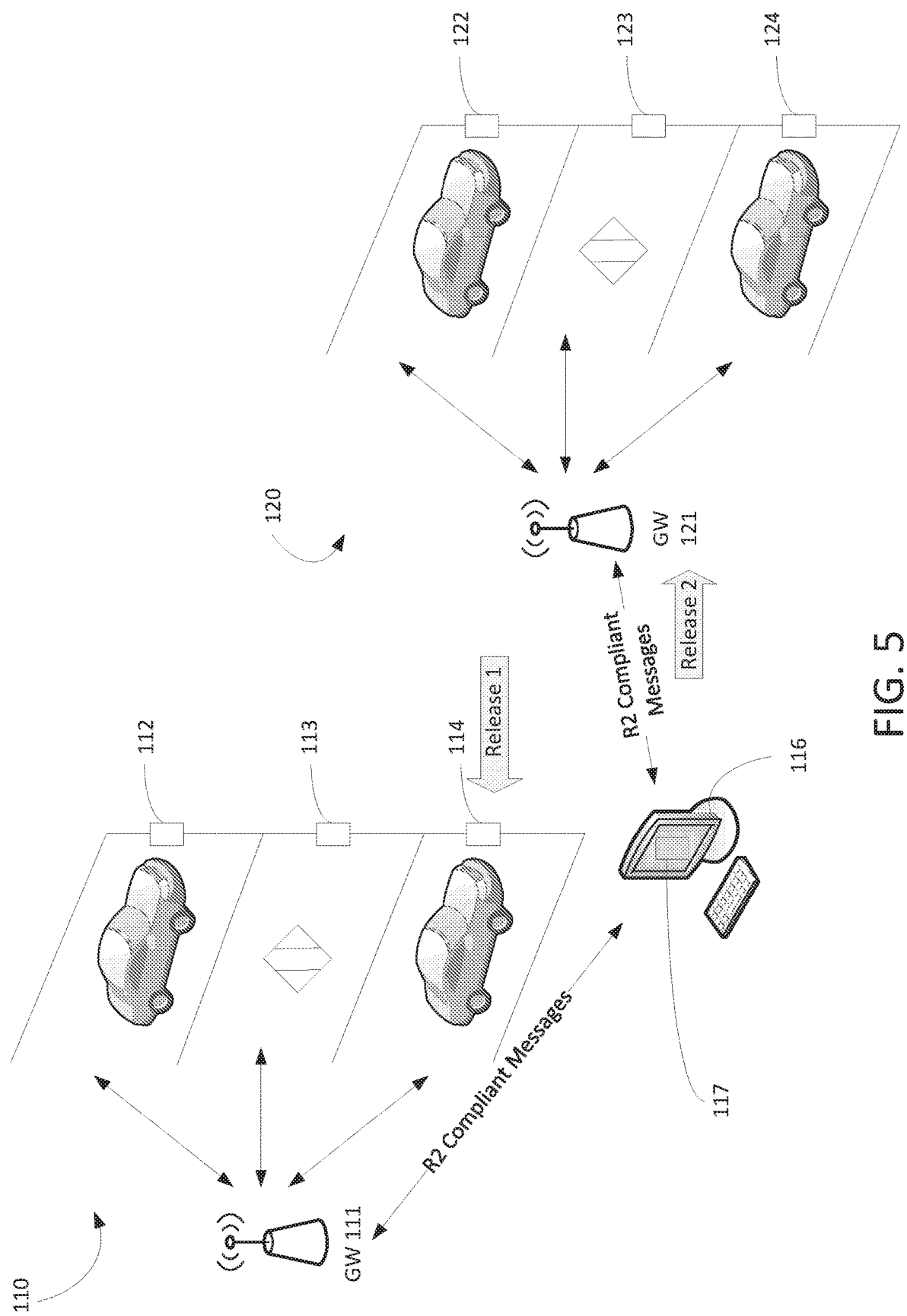
FIG. 5 illustrates an exemplary Use Case: Parking Lot Management.

In FIG. 5, gateway 111 (GW 111) is a release 1 compliant service layer that supports a smart parking system deployment. The vehicle proximity sensors (sensor 112, sensor 113, sensor 114) send messages to the service layer (e.g., GW 111), indicating if the monitored parking space is occupied or not. GW 121 is a release 2 compliant service layer that has additional functionality available through changes to the application programming interface (API). The vehicle proximity sensors (sensor 122, sensor 123, sensor 124) are release 2 compliant as well as application 117 on device 116 that monitors the sensors in parking lot 110 and parking lot 120. A release, version, or the like may indicate a stage of development. For example, a release A may be a stage of release of software at a time t1, while release A.1 may be a stage of release of software at time 2. In another example, a release 1 may be a first release of a standard that governs software or hardware, and a release to 2 may be a second release of a standard that governs software or hardware.

Figure 6:
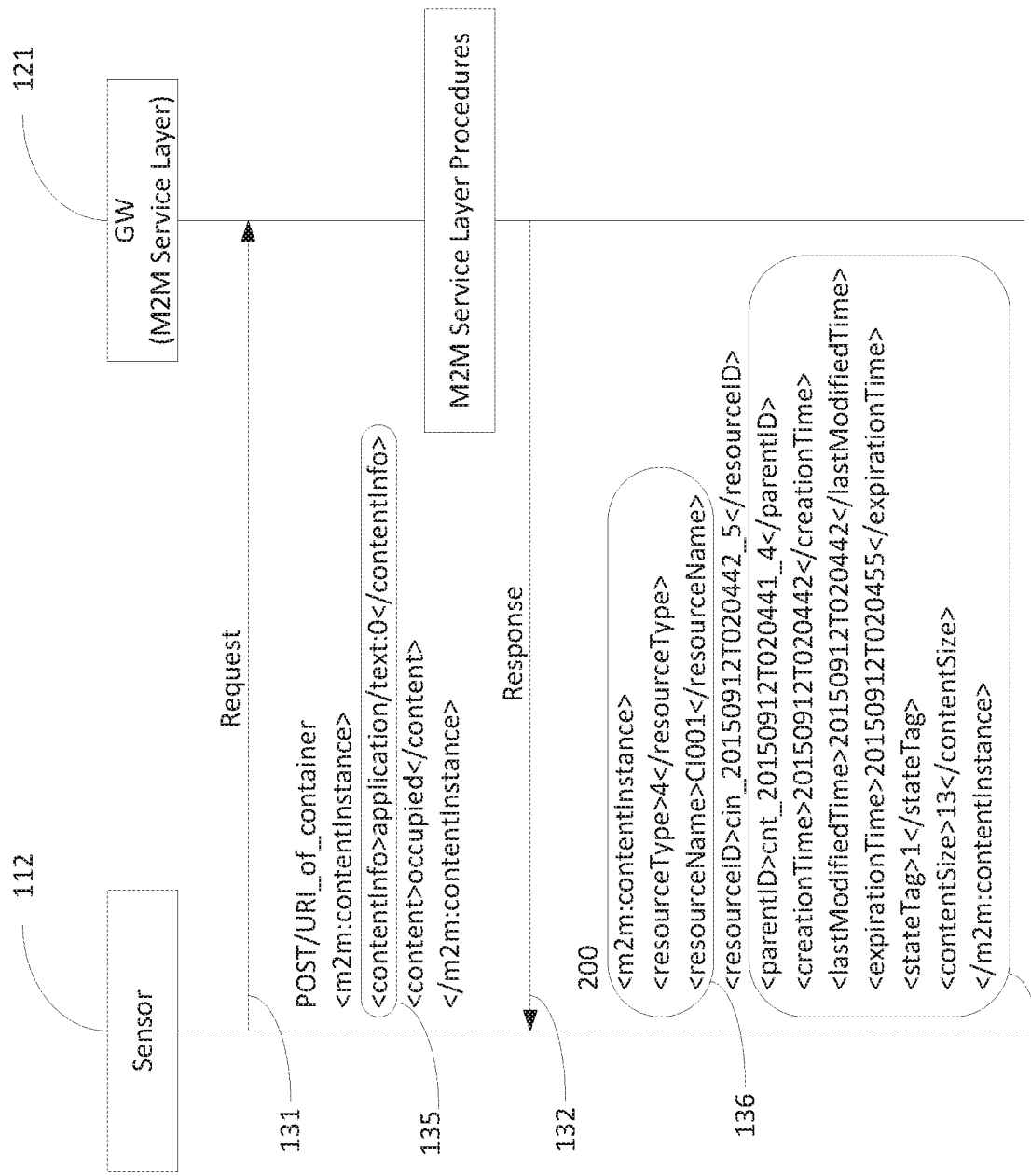
FIG. 6 illustrates an exemplary request/response message with extra information.

In this deployment, the sensors each have a single measured value that may be sent to gateway 111 or gateway 121. The measured value may be indicative of "occupied" or "unoccupied" (this could be '0' or '1' or any other application specific values, but the values examples). Service layer APIs frequently require additional information in order to create a resource. For example as shown in FIG. 6, at step 131, an oneM2M Service Layer request message is sent from sensor 112 that indicates a parking space sensor value, the contentInfo (cnf) attribute is used to understand the content. However the value is constant in the context of the sensor application. The size of the request message is increased because of the need to specify the same information (information 135) along with each subsequent sensor value. At step 132, there is a response message received by sensor 112. The response message of step 132 may include data that the sensor will not need to use.

Figure 7:
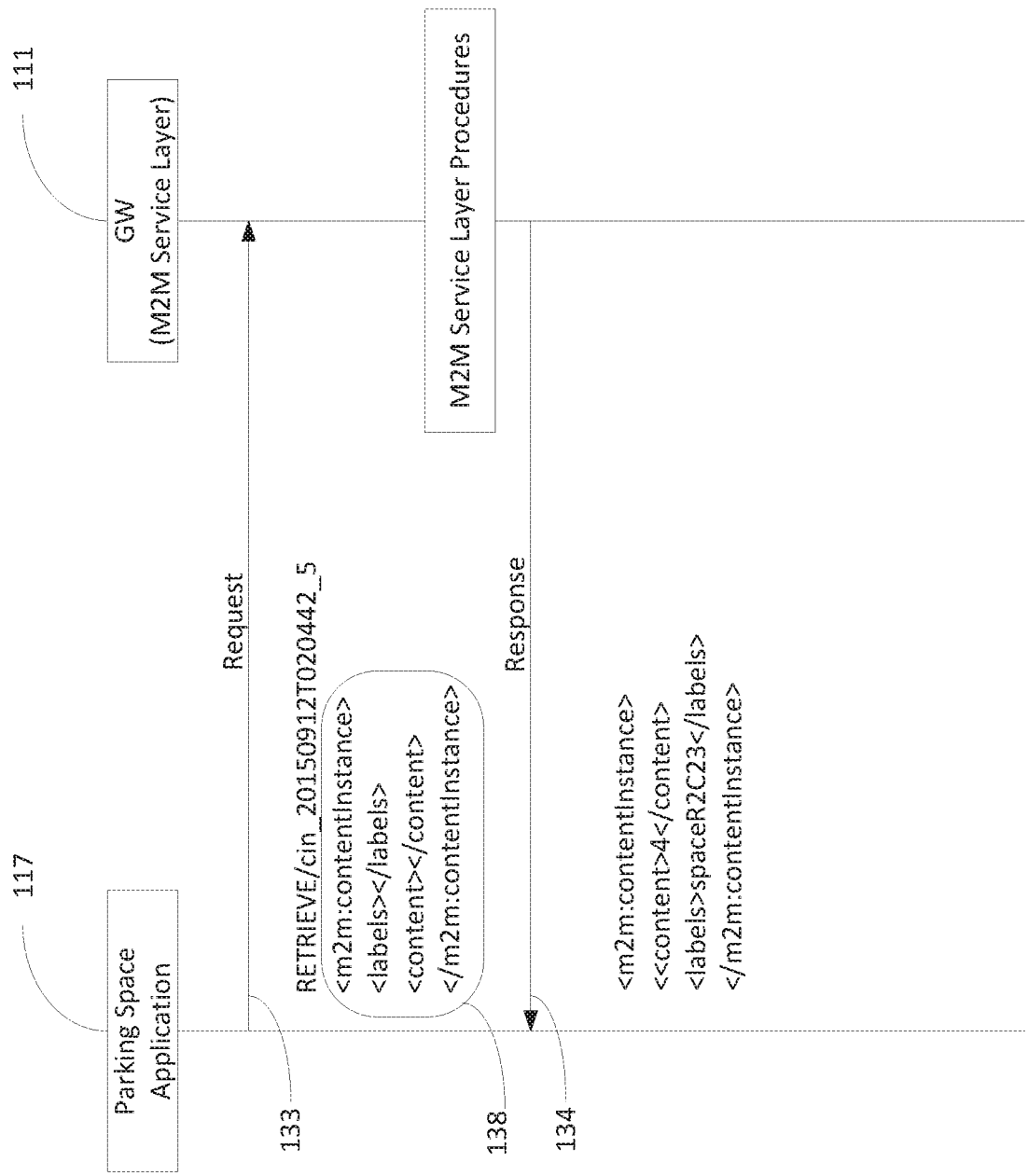
FIG. 7 illustrates an exemplary Partial Retrieve of two attributes of a <contentInstance>.

FIG. 7 illustrates a method in which an application (e.g., application 117) that indicates vacant or occupied parking spaces. Application 117 may cause a GUI of device 116 to show vacant parking spaces. Application 117 may only need the labels and content attributes of the content instances to show vacant parking spaces. Application 117 in this scenario is designed such that it does not need to use all of the metadata of a particular resource. Here, a RETRIEVE request (step 133) for a <contentInstance> resource provides the entire resource representation, while a partial retrieve can be used to reduce the response to ONLY the desired attributes, it requires extra information in the request (information 138).

Figure 8:
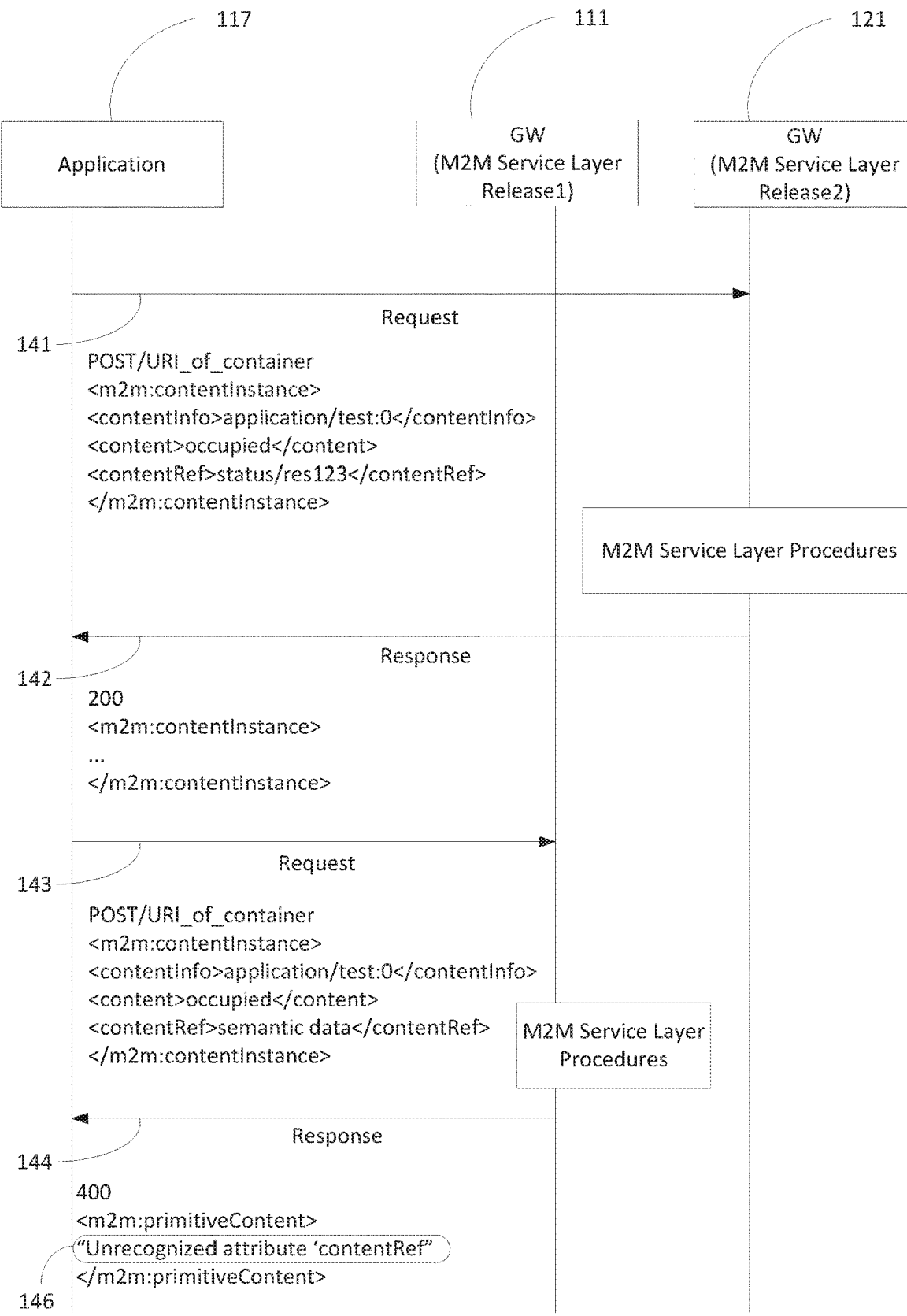
FIG. 8 illustrates an exemplary Error response due to unrecognized release 2 features.

FIG. 8 illustrates an exemplary conventional error response due to unrecognized release 2 features. For example, sensors in new parking lots are updated to take advantage of new features offered by the newer version of the service layer. In this deployment, not all service layer instances have been upgraded to the latest SW. The new features include some modifications at the API, such as new resource attributes. An example for the oneM2M Service Layer could be related to Release 2 capabilities. In release 2, a contentRef attribute is added to the <contentInstance> resource. When application 117 attempts to update the resources in the existing GW 111, there is an error because that attribute is not recognized (see steps 143 and 144 and error 146). Meanwhile it works for the sensors registered to GW 121 (step 141 and 142). This means in conventional scenarios that application 117 has to be able to identify the service layer versions, based on the response and modify the requests to remove unsupported attributes. This can quickly become a major source of expense in terms of code size, code complexity, or development costs to maintain an application that is compatible with multiple service layer and application versions.

The system, methods, and apparatuses discussed herein show how profile based services and content can enhance the performance and functionality of conventional service layers or the like. Using a profile to manage content and access to services offered may reduce the overhead or processing associated with providing those value added services by service layers.

It is understood that the entities performing the steps illustrated herein, such as FIG. 9-FIG. 13, FIG. 16, and FIG. 17, may be logical entities. The steps may be stored in a memory of, and executing on a processor of, a device, server, or computer system such as those illustrated in FIG. 20C or FIG. 20D. In an example, with further detail below with regard to the interaction of M2M devices, applications (e.g., parking lot system integrator) may reside on M2M terminal device 18 of FIG. 20A, while service layer may reside on M2M gateway device 14 of FIG. 20A.

Figure 9:
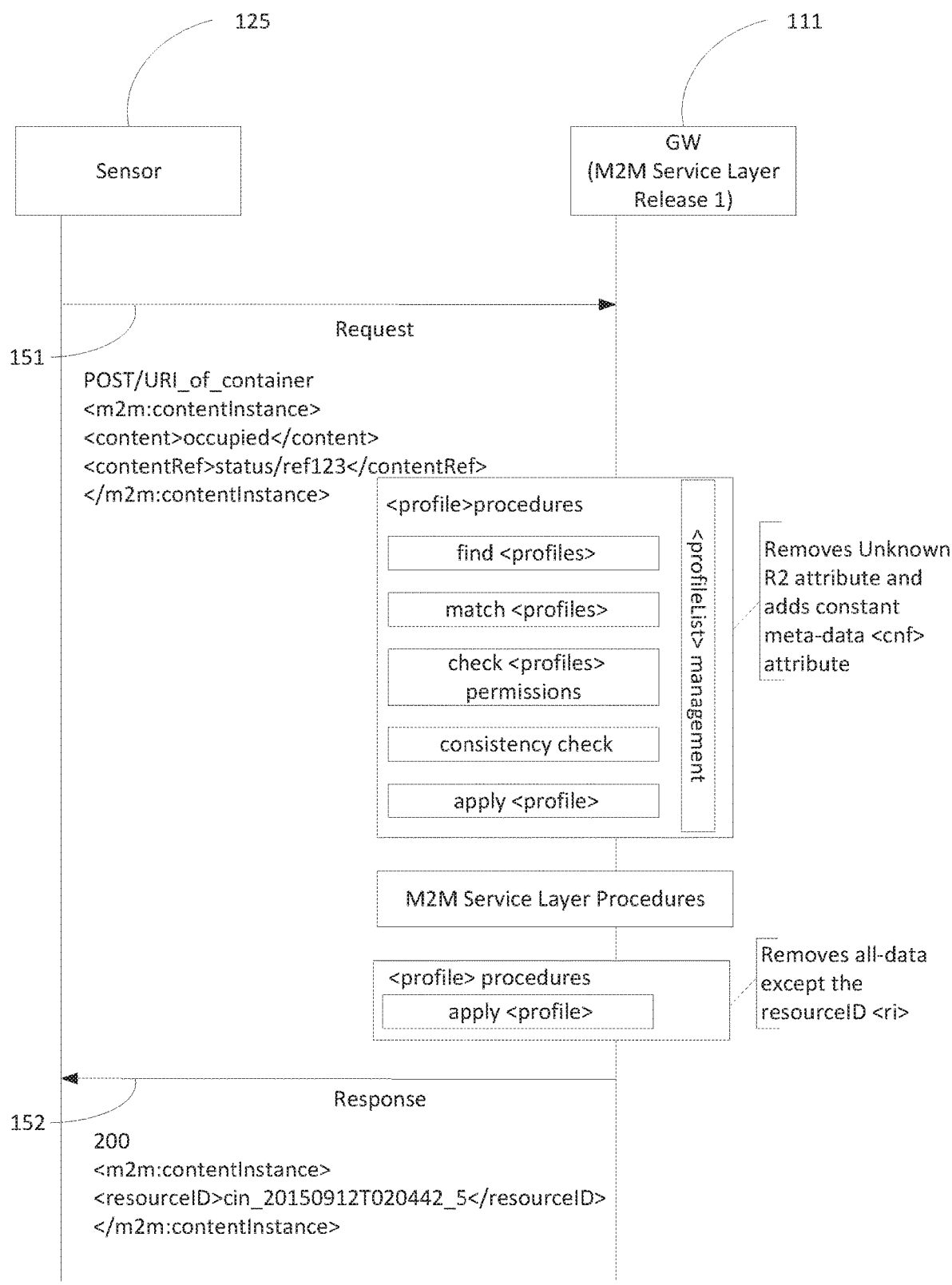
FIG. 9 illustrates an exemplary request and response associated with compatibility.

FIG. 9 illustrates an exemplary backward compatibility method, as discussed in more detail herein. At step 151, sensor 125 (a release 2 compliant sensor) sends only the measured sensor data that has changed for each measurement. In an example, profile (or profiles) of GW 111 (e.g., a M2M Service Layer) may be applied to assign desired default values. At step 152 a "200-CREATED" response is received by sensor 125 with only the information that sensor 125 uses. GW 111 was able to process the unknown attribute from the later release definitions.

In a M2M Service Layer there are generally resources or objects that are defined by the service layer. Each resource or object has attributes or meta-data that describe the resource. The M2M Service Layer provides value-added services that operate on these resources. The M2M Service Layers also define messages or primitives or an API that access the M2M Service Layer resources or services. Herein, a profile resource or object may be defined specific to the service layer that it operates in. The profile definition may be applied to one of these components (resource, attribute, or API) or combinations of them.

The <profile> definition includes a specification of who or what to apply the <profile> to. For example, a <profile> can be defined to apply to messages from specific originators, it could apply to all messages targeting specific type(s) of resources, it could apply to all messages with a specified RESTful operation(s), it could apply to messages addressing resources within a specified uniform resource identifier (URI) path, or it could apply to all messages of a specified version/release. These applyTo values can also be combined to apply to a combination of these components (e.g. CREATE <contentInstance> at/targetUri—from AppUser01 using Release2). Table 3 shows some possible parameters or attributes that a <profile> could apply to. A <profile> can be applied to any of the information fields in a M2M Service Layer message.

TABLE 3

<profile> resource attribute "applyTo"

| Attribute | Sub-Attribute | Description |
| --- | --- | --- |
| applyTo | IDlist | List of entities that the profile applies to. |
| | resourceTypeList | List of resource types that the profile applies to. |
| | operationList | List of operations or responses that the profile applies to. |
| | resourceIDList | List of resources or targetURIs that the profile applies to. |
| | releaseNumber | Release number or identification that the profile applies to. |

The <profile> specifies what actions to apply to the M2M Service Layer messages. For example, the <profile> could add an expirationTime attribute to the resource payload and change the requestExpirationTime of a request message. The <profile> actions of Table 4 may appear multiple times and in any order.

TABLE 4

<profile> Resource Attributes for Actions

| Attribute | Sub-Attribute | Description |
| --- | --- | --- |
| addAttribute | attrName, [attrValue] | attrName is the attribute that should be added to the payload of the message. The [attrValue] is the value that should be set for the attribute. For Retrieve cases, only attrName is included to indicate only the attributes listed are to be returned. |
| removeAttribute | attrName | attrName is the attribute that should be removed from the payload of the message. |
| changeAttribute | attrName, attrValue | attrName is the attribute that should have its value replaced with attrValue. |
| replaceAttribute | attrName1, attrName2 | attrName1 is the attribute that should be changed to attrName2 while retaining the value specified (if any). |

TABLE 4-continued

<profile> Resource Attributes for Actions

| Attribute | Sub-Attribute | Description |
|---|---|---|
| removeAllExceptAttribute | attrName | All attributes are removed except attrName. attrName is the only attribute that will be retained. |

A system profile may be defined to implement compatibility with different versions of the M2M service layer. The set of profiles used by the M2M service layer may be provided via an admin console application, deployed via an upgrade through device management, or through an internal interface such as a configuration file.

Figure 10:
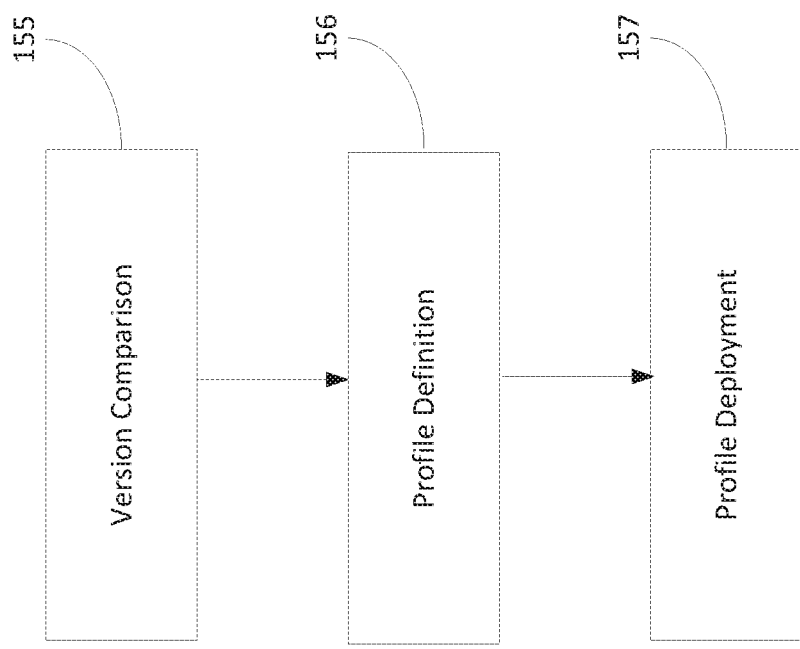
FIG. 10 illustrates an exemplary method for applying service layer profile.

FIG. 10 illustrates an exemplary method for applying service layer profile. At step 155 there may be a version comparison. At step 155, there may be an identification of differences in messaging of two different versions of a specification. These differences may be in the payload of the message or the parameters of the message. In an example, oneM2M system Release 1 or Release 2 does not specify a message parameter that identifies the version that the message applies to while in future versions it is possible.

At step 156, the differences identified may be used to create a <profile> definition that the M2M Service Layer applies to a message that is to be made compatible with the other version by adding, removing, or setting data/metadata in the message content (e.g., header or payload). This identification may be a manual process or it may be automated with tools that compare documents to identify changes and then use those changes to develop scripts or other tools to create the <profile>. The process of identifying differences in messages formats from one release to another release defined above may be used to make messages backward compatible or forward compatible if suitable defaults exist. In some cases making a message forward compatible may enable legacy devices to use new functionality. Below is an exemplary code that may be used for step 156:

```
<applyTo>
    <IDList>*</IDList>
    <resourceTypeList>contentInstance<resourceTypeList>
    <operationList>RETRIEVE <operationList>
    <resourceIDList>*</resourceIDList>
    <releaseNumber>R2</releaseNumber>
</applyTo>
        <removeAttribute>contentRef</removeAttribute>
```

At step 157, the profile is deployed to the legacy M2M Service Layers as an update to the software/firmware or through configuration.

The procedures presented below describe how to deploy a custom <profile> by M2M Service Layer entities to enable application specific optimizations. A custom profile may be tailored by an entity of the M2M Service Layer to apply to itself or, if appropriate permissions are granted, to another entity.

The <profile> components and procedures described above (system profile development) apply to customs profiles, except instead of identifying differences in two versions of a M2M Service Layer, the desired result (adding, removing, or updating attributes) is defined. Custom profile development changes the step of identifying difference, to a different step changing the value of an attribute.

Figure 11:
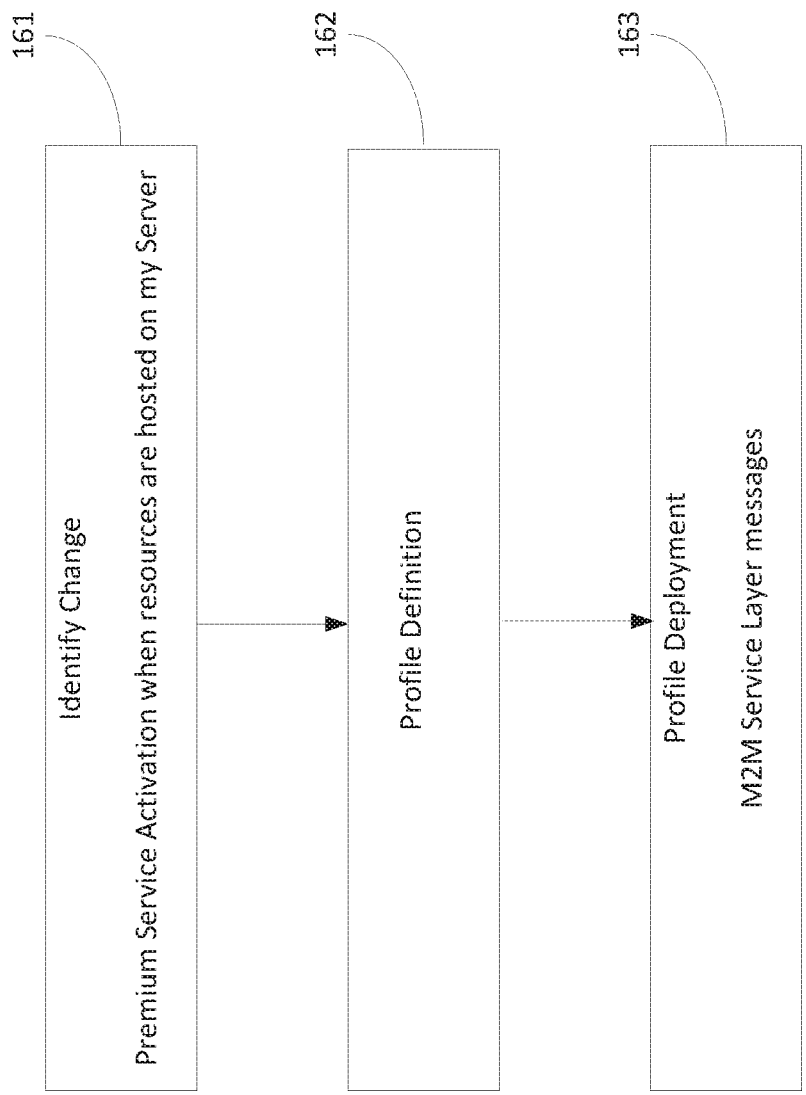
FIG. 11 illustrates an exemplary Custom Profile Deployment.

FIG. 11 illustrates an exemplary method for custom profiles. In this example, a premium service is offered and applied to resources hosted on the service provider's M2M Service Layer instance. At step 161, a change is identified. When a user announces a resource from another Hosting M2M Service Layer to the premium service providers M2M Service Layer the premium service is provided at step 161. The subscriber of the premium service is "user001", in this example, and that user already has devices deployed that send data to its Host M2M Service Layer. The <profile> is defined, in step 162, so that those devices do not need to be modified in order to access the premium service offered. Below is exemplary code that may be used in step 162:

```
<applyTo>
    <IDList>user001</IDList>
    <resourceTypeList>container<resourceTypeList>
    <operationList>CREATE<operationList>
    <resourceIDList>*</resourceIDList>
    <releaseNumber>*</releaseNumber>
</applyTo>
<addAttribute>announceTo=//premium.serivce.provider</addAttribute>
```

At step 163, the profile may be deployed. The <profile> may be sent in an M2M Service Layer message to the resource Hosting M2M Service Layer. Before accepting the <profile> the M2M Service Layer may check that the "originator" of the message has permissions to create a <profile>. There also may be a check that the "originator" has permissions to perform the described operations on the resource. Permissions check after applying the profile to a message is discussed in more detail herein.

Figures 12A, 12B:
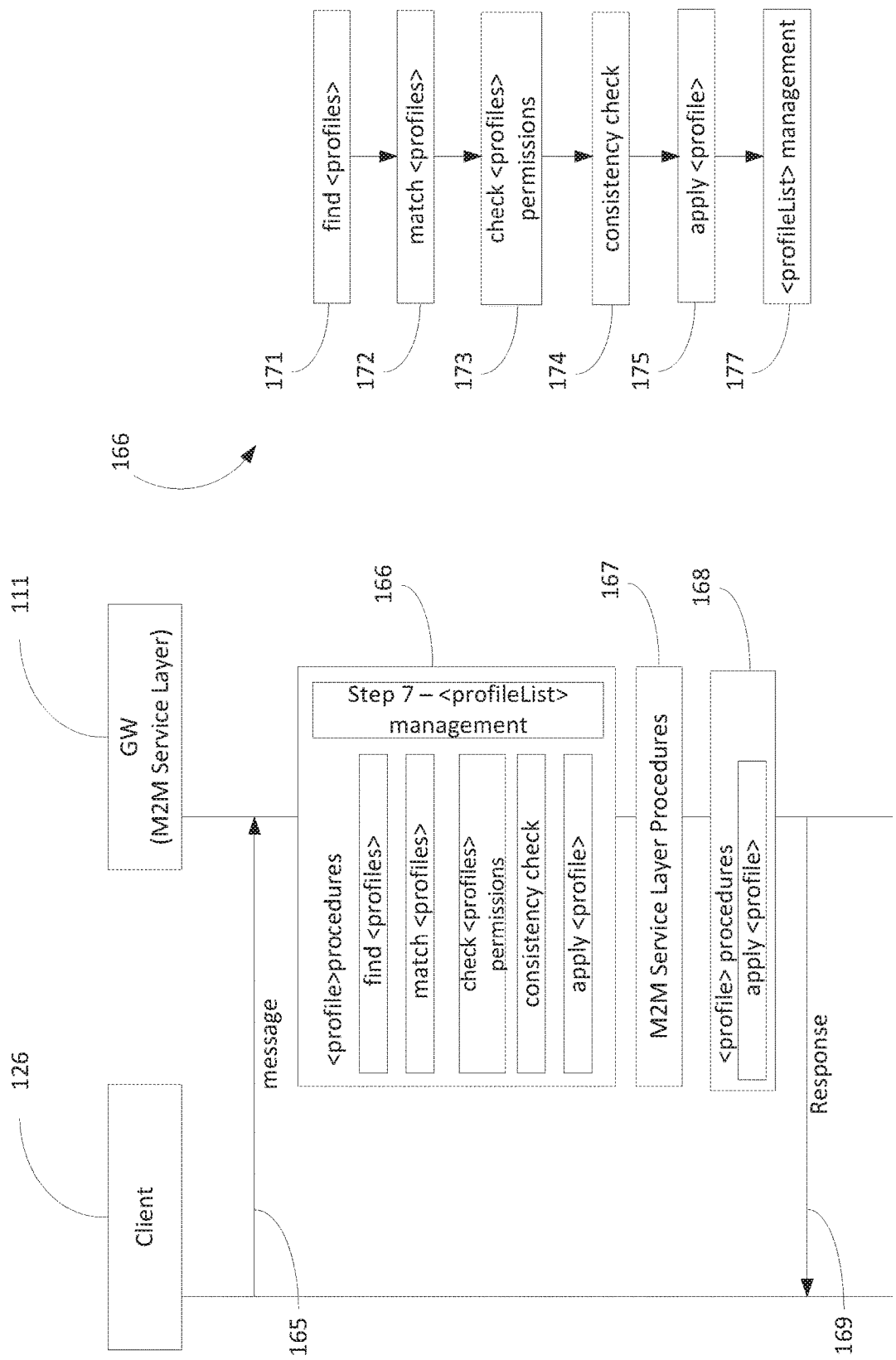
FIG. 12A illustrates an exemplary method to apply a profile.
FIG. 12B illustrates an exemplary method to apply a profile.

FIG. 12A-FIG. 12B are exemplary methods for applying a profile that has been defined as discussed herein. It is contemplated that the profiles may be applied in order to generate a new message that has the appropriate functionality for release (e.g., version, semantic functionality update, etc.). The profiles may be applied by an intermediary device or it may be applied by and end device (e.g., target endpoint device). At step 165, GW 111 receives message, such as a service layer message. At step 166 <profile> procedures are applied. At step 167, other M2M service layer procedures are applied. At step 168, other <profile> procedures are applied. At step 169, GW 111 send a message based on the processing that occurred in step 166, step 167, or step 168. GW 111 searches for applicable profiles and applies them to the message before responding to the originator (e.g., client 126 of FIG. 12A).

With reference to FIG. 12B, method 166 provides further details with regard to how profiles may be applied. At step 171, the profiles are searched for based on the "applyTo" attribute. The first search may capture all of the profiles that apply to the message received. An example search, using SQL type language is below:

```
SELECT all profiles WHERE IDlist contains Originator OR
resourceList contains targeturi resource type OR OperationList
contains operation OR URIPath contains targeturi OR ReleaseNumber
equals version.
```

This search generates a list of profiles (e.g., a candidate list that match search) that may apply to the received message. At step 172, each selected <profile> is checked for a match. The method may be setup so that match occurs if and only if all of the "applyTo" criteria match. This may generate multiple matches. The M2M Service Layer may support multiple matches or generate an error if more than one match occurs.

With continued reference to FIG. 12B, at step 173, each matched <profile> may be checked to ensure that the "creator" of the <profile> has permissions to perform the desired actions on the targeted resource(s).: In the "system profile" examples, the service layer itself is the "creator", which would not require checking for permissions. In the "custom profile" examples, the 'entity' that defines the profile and stores the definition in the service layer is defined as the "creator" of the profile. In some cases this may be completed when the <profile> resource is created, but in other cases the <profile> resource may be defined in a manner that allows a large set of matched messages that include resources that were not intended. For example, a <profile> that specifies "ApplyTo.IDList=*" can be selected in many messages, including messages that apply to resources that the <profile> "creator" does not have permission to access. The <profile> resource contains an attribute "permissionsVerified" which is set by the M2M Service Layer when the <profile> is created or updated if the <profile> permissions can be definitively verified. This helps to reduce the amount of processing needed on each M2M Service Layer message. For <profile> resources that are not definitively verified, when a message is selected and matched, the permissions of the <profile> creator may be checked against the specific resource that the message applies to. This paragraph addresses "authorization" of an entity to access a resource. The "custom profile" has the potential to be applied to many resources instances. The creator of the profile may not be authorized to perform operations on some of those resource instances. Describe herein is a manner to help ensure that "authorization" policies are enforced.

At step 174, describes a case where multiple matches occur. In that case a consistency check may be applied to ensure that the changes described by the policy do not conflict with each other. For example, two profiles that perform addAttribute, such as "expirationTime=date1" and "expirationTime=date2" conflict with each other. This may be handled according to the M2M Service Layer policies. For example, the M2M Service Layer may detect the conflict and notify the creator of the profiles, the originator of the message that the profile is applied to, the M2M Service Layer system administrator, or any combination of the previous entities or another designated entity. Alternatively, the M2M Service Layer may simply apply the profiles and let the final result stand. At step 175, profiles are applied to the M2M Service Layer message prior to normal processing, as described in the example above in FIG. 9. At this step 175, GW 111 may remove unknown release attributes (e.g., remove release 2 attributes). At step 168, the profiles are applied to the M2M Service Layer message after normal processing, such as when the operationList specifies "RETRIEVE" and removeAttribute is "expirationTime." Step 168 is separated from the other steps. This is done because the profile procedures may impact the service layer message at the input of the service layer, to change values. Or it may be applied just before sending a response. An example of this is from the use case that shows removing unused attributes from a response message.

With continued reference to FIG. 12B, at step 177, list management may occur. Profile list management may be used to optimize the process of applying a <profile>. For the case where multiple profiles for a particular message are supported, the profiles may be in an order specified or based on a policy or rules specific to the M2M Service Layer. The M2M Service Layer may maintain a profile list that groups and orders the profiles, shown in Table 5. A profile list may be created based on the search and matches described herein. The same search criteria may be used to generate a key that uniquely maps to the result of the list of profiles that are to be applied. The idea is to limit the frequency of performing this search, because if done for every message that arrives, it could cause performance degradation. To reduce the degradation of performance, once a search is performed, results of the search may be saved. If the search is saved, the ability to look it up again is needed. A way to look it up again is to store the results in a lookup table, or key-value structure. The value is the list of profiles that match the search criteria. The key is the search criteria. This process may be used to optimize the search and matching of profiles that would otherwise occur for every M2M Service Layer message received. If the search for profiles generates zero matches, that is stored as well. Anytime a new profile is added this list needs to be updated or regenerated. If <profileList> resource is used, this list is searched before step 171. The search criteria may first be used to generate a key. If the generated key is found in the <profileList> then the information stored in the profileIDs may eliminate the need for step 171 through step 174.

TABLE 5

| <profileList> resource | |
| --- | --- |
| profileIDs | Ordered list of <profile> resources that are applied to the M2M Service Layer message. |
| matchKey | Unique value generated from the combined search criteria used to select and match the <profiles> that should be applied to a message. |

Alternative 1: The <profile> resource may include a "link" attribute that is used to create a linked list of <profile> resources that are applied to a message.

Alternative 2: The originator may include a parameter in the message that specifies the <profile> or <profileList> to apply to the message. This may be used in place of the "select" (step 171) and "match" (step 172).

A profile test mode is discussed below. When profiles are created, updated, or deleted, the side effect of the final profile list (1 or more profiles) is that they are modified, which may leave conflicts or invalid messages. An error handling method and test mode method discussed below may address the scenarios regarding conflicts or invalid messages.

Figure 13:
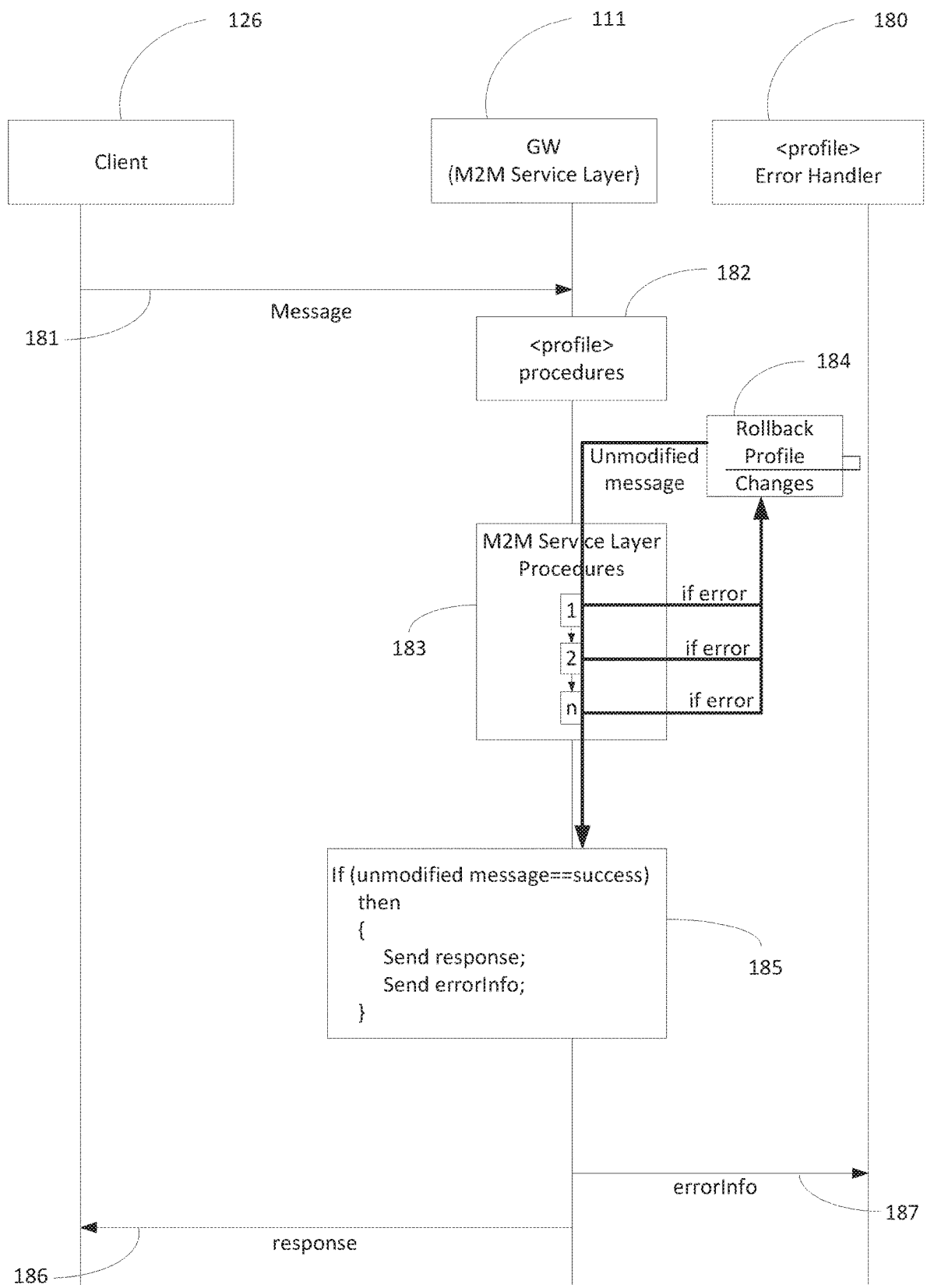
FIG. 13 illustrates an exemplary method for Profile Error Handling.

FIG. 13 illustrates an exemplary profile error handling method. In FIG. 13, error handling procedures are defined for when the message resulting from application of a <profile> generates an M2M Service Layer error. At step 181, a message from client 126 is received by GW 111. At step 182 <profile> procedures are applied. At step 183, other M2M service layer procedures are applied and an error is detected. Because an error is detected at step 183, the modified message is reverted back to its initial state (e.g., the message at step 181) prior to the application of the profile(s) at step 182 and reprocessed in its unmodified form through the M2M Service Layer. If the message after the rollback of step 184 is able to be processed without error, the error details from the profile modified message may be logged or reported to the profile creator or administrator of the M2M Service Layer. For example, at step 185, the unmodified (rolled back) message is successfully processed, so a response message is sent to client 126 at step 186 and error information is sent at step 187 to <profile> error handler 180. Giving further context, if an error occurs because of a profile, then there should be an attempt to process the original message sent by the client. So as an example, from the use case described earlier, if the profile is used to add the (cnf) attribute to contentInstance, but a bug causes the (cnf) to be added to an AE resource, this will fail the service layer procedures because the AE does not support the cnf attribute. It is desirable to remove cnf from the message from the client, restoring the message to the original state sent by the client. A goal is to process that original message. If the message was create AE, the response would include "OK CREATED." Alternatively, if the message is still not able to be processed, then an error message based on the unmodified message may be returned to client 126.

Test methods are also defined to support identifying the cause of errors resulting from application of a <profile> or <profileList> to a M2M Service Layer message. Testing the resulting conflicts can also be done during the profile create or profile update process. The <profile> has a testMode attribute that indicates that the profile can be used or applied to incoming M2M Service Layer messages, or that it is in test mode. The search in step 165 of FIG. 12A may exclude a <profile> resource that has testmode attribute set to true unless the message parameter indicates "testmode." A message that has "testmode" indicated may "override" select attributes used for the <profile> selection to test the results of a <profile> or <profileList>. A message that is in test mode may not cause permanent changes to the M2M Service Layer resources or data. Test mode may be a special permission granted to M2M Service Layer Entities. When a message indicates "testmode" the M2M Service Layer may optionally check that the originator has permission to specify that attribute. As an example, in testmode, related to FIG. 12A, only step 167 is modified to prevent storing the result of request, so a create request, that is modified to add (cnf) due to a profile under test, would go through all steps except storing the new resource in the database. The response would indicate that the operation was successful or not, but there would be no persistence of the response.

Figure 14:
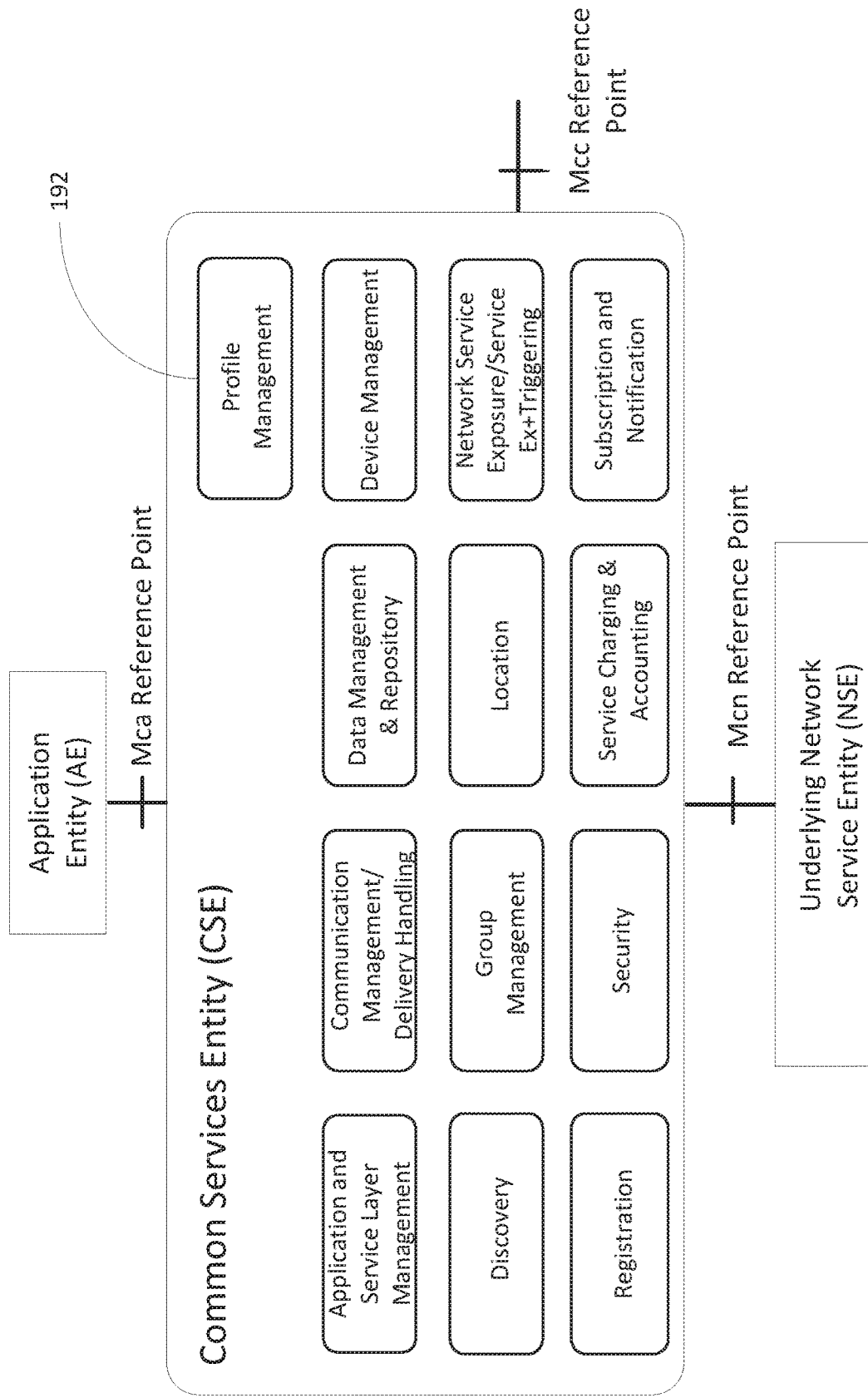
FIG. 14 illustrates examples specific to oneM2M.

Below are examples of a use case in the context of oneM2M. For the oneM2M scenario, there includes new CSF profile management 192, as shown in FIG. 14. There also may be two new resources, <profile> 193 and <profileList> 195, as shown in FIG. 15.

Figure 15:
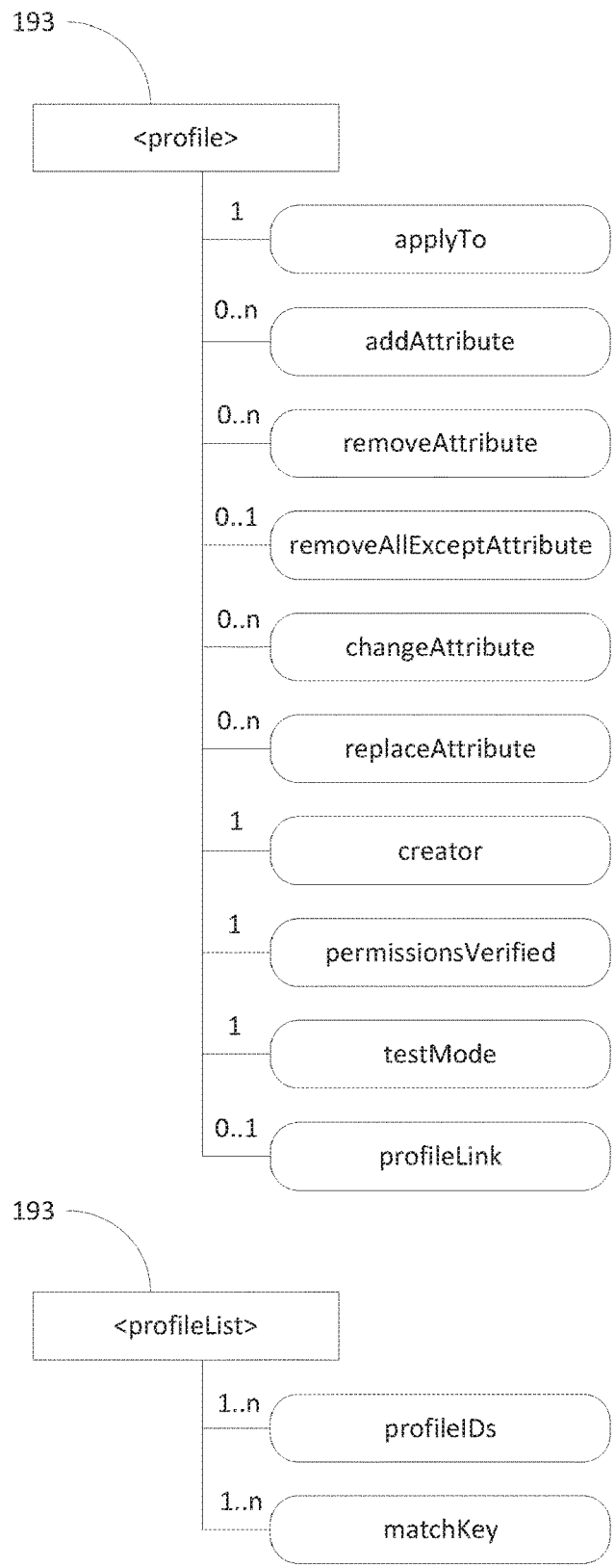
FIG. 15 illustrates exemplary oneM2M structure of <profile> and <profileList> resources.

The definitions and functionalities of these attributes associated with FIG. 15 may apply and are not repeated here. Common resource attributes apply, but are not shown, and these resources could be announceable. <profile> 193 and <profileList> 195 may be child resources of <cseBase>, <remoteCSE>, and <AE>. Then the scope of the search step includes the originator's registration resource <AE> or <remoteCSE> plus the <cseBase>. The "search step" refers to the procedure to find profiles that match the search criteria. The location of the <profile> resources is specified in the resource-tree. Then when searching for <profiles> to apply to a message, the starting point of the search may be a specific resource, such as <AE>, or any child (or descendent) resource of the <AE> resource.

The profiles provided below may assist in implementing the profile based content and services as described herein, such as described in association with FIG. 9.

1. A system <profile> that removes contentRef attribute from all <contentInstance> resources

```
<m2m:profile>
<applyTo>
    <resourceTypeList>contentInstance</resourceTypeList>
    <operationList>CREATE UPDATE</operationList>
</applyTo>
<removeAttribute>contentRef</removeAttribute>
</m2m:profile>
```

2. A custom <profile> that adds a contentInfo attribute to each CREATE <contentInstance> from the sensors specified in applyTo.IDList

```
<m2m:profile>
<applyTo>
    <IDlist>senP1 senP2 senP3 senP4</IDList>
    <resourceTypeList>contentInstance</resourceTypeList>
    <operationList>CREATE</operationList>
</applyTo>
<addAttribute>cnf application/text:0</addAttribute>
</m2m:profile>
```

3. A custom <profile> that removes all attributes except resourceID (n) from a create response

```
<m2m:profile>
<applyTo>
    <IDlist>senP1 senP2 senP3 senP4</IDList>
    <resourceTypeList>contentInstance</resourceTypeList>
    <operationList>CREATED</operationList>
</applyTo>
<removeAllExceptAttribute>ri</removeAllExceptAttribute>
<m2m:profile>
```

Figure 16:
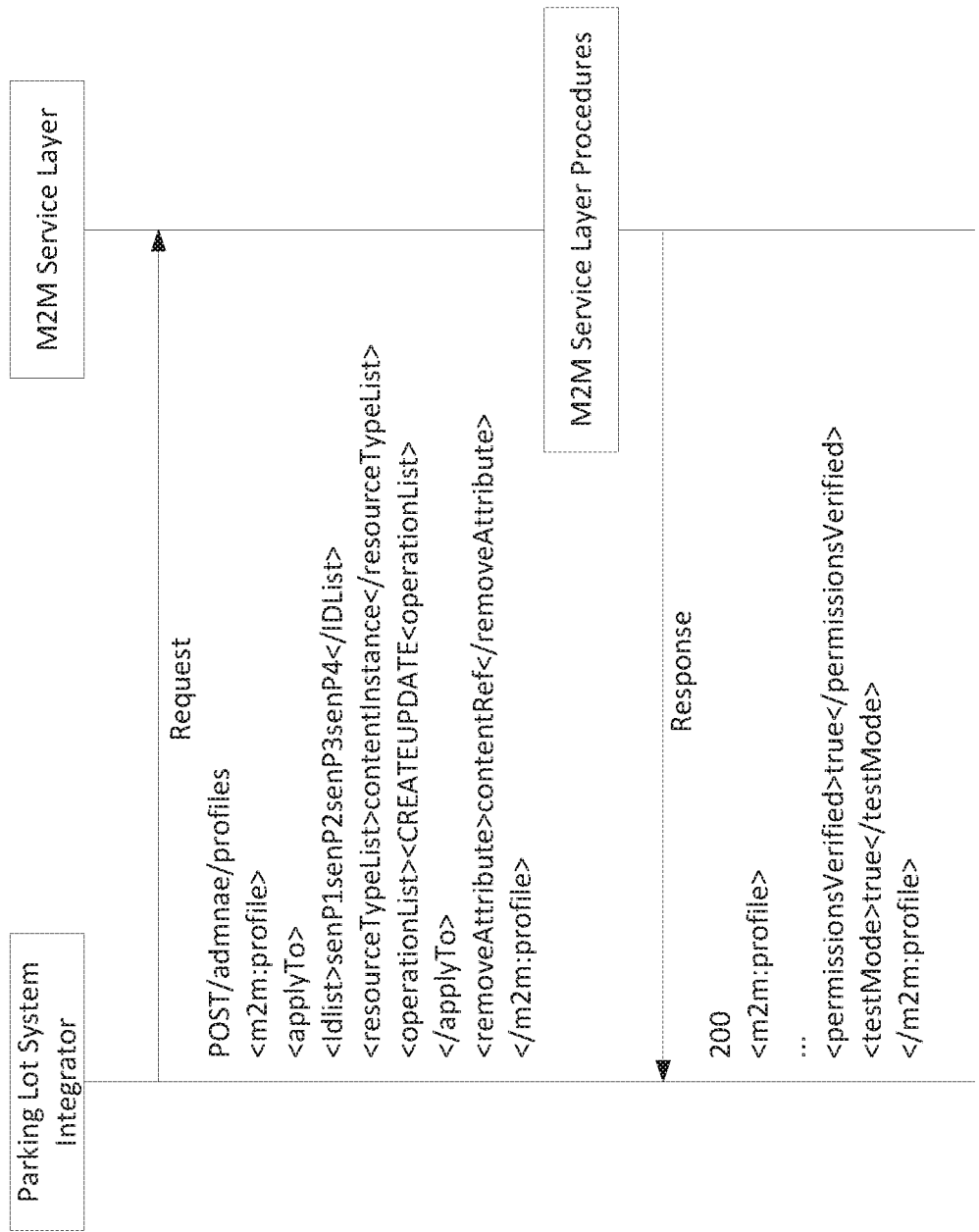
FIG. 16 illustrates an exemplary method for CREATE <profile> for profile #2.

The profiles shown above may have all attributes and values use shortnames and enumerations in a deployed oneM2M system. The longnames are shown in these examples for the sake of clarity. The system profile, profile #1, can be deployed via a software or firmware upgrade of the oneM2M CSE. That process would typically use device management procedures which are outside the scope of this paper. The two custom profiles, profile #2 and profile #3, may be deployed by a systems integrator or vendor of the parking lot oneM2M MN-CSE using existing procedures. FIG. 16 illustrates an exemplary primitive request and response for profile #1.

Profile #2 and #3 are defined such that the M2M Service layer may verify that the "adminae" user has permissions to change the <contentInstance> resources that are created by "senP1 senP2 senP3 senP4". Profile #1 cannot deterministically verify permissions since <contentInstances> will have the contentRef attribute removed, therefore this check may be done during each Select and Match procedure. Once the <profile> resources are successfully created, the system integrator may test to make sure that they work as expected using the testMode.

Figure 17:
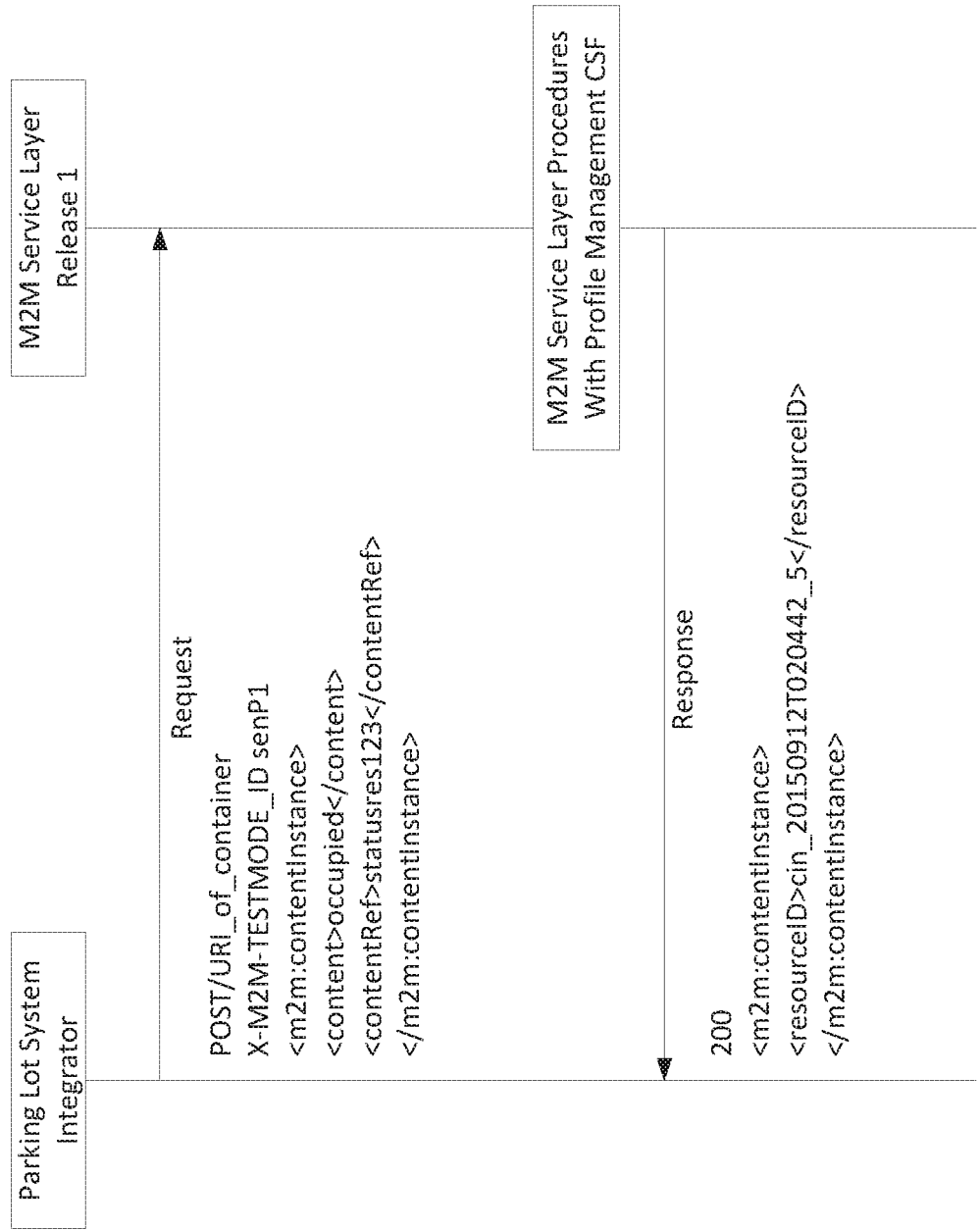
FIG. 17 illustrates an exemplary method for <profile> Test Mode.

FIG. 17 shows the request with a new oneM2M primitive attribute, testmodetestMode_id. This allows the user to make sure that the <profile> defined works as expected. In this case, while the originator or the requestor is the system integrator, the M2M system will use "senP1" as the originator. In this example, the originator should have "TEST_PROFILE" permissions otherwise use of the testmodetestMode_id attribute (shown as X-M2M_TESTMODE_ID in FIG. 17) will generate an error, such as PERMISSION_DENIED Once the system integrator is satisfied, an UPDATE request is made to change the testMode attribute to NULL.

Figure 18:
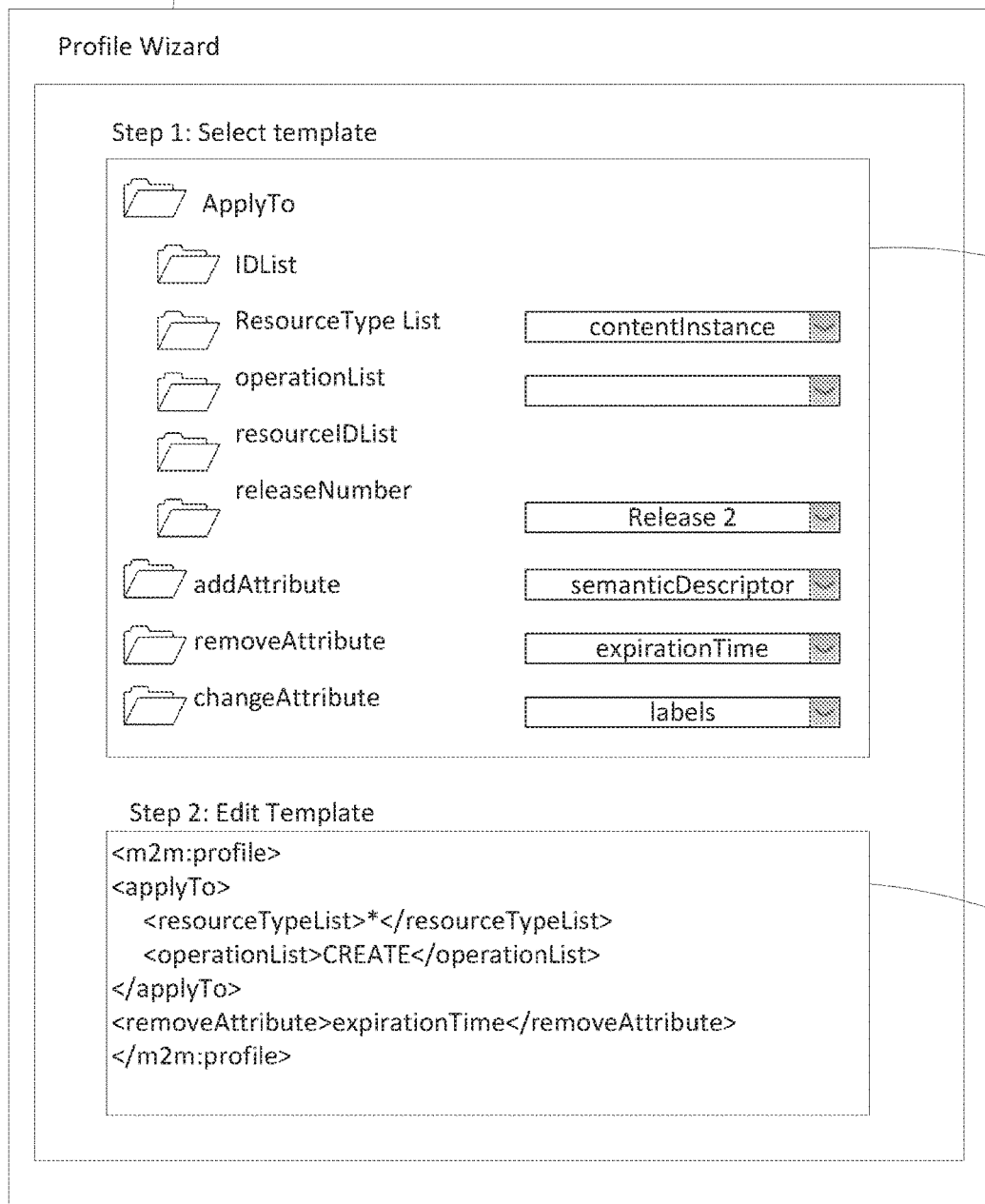
FIG. 18 illustrates an exemplary user interface for generating <profile> resources.

FIG. 18 illustrates an exemplary user interface associated with profile based content and services. FIG. 18 illustrates a "wizard" 201 may have a template generator 201, which may generate a <profile> resource. In the example of FIG. 18, a template may be selected to apply. The selected template may be inserted into a <profile> resource with a selected value or an edit field (block 203) to modify the template contents.

Figure 19:
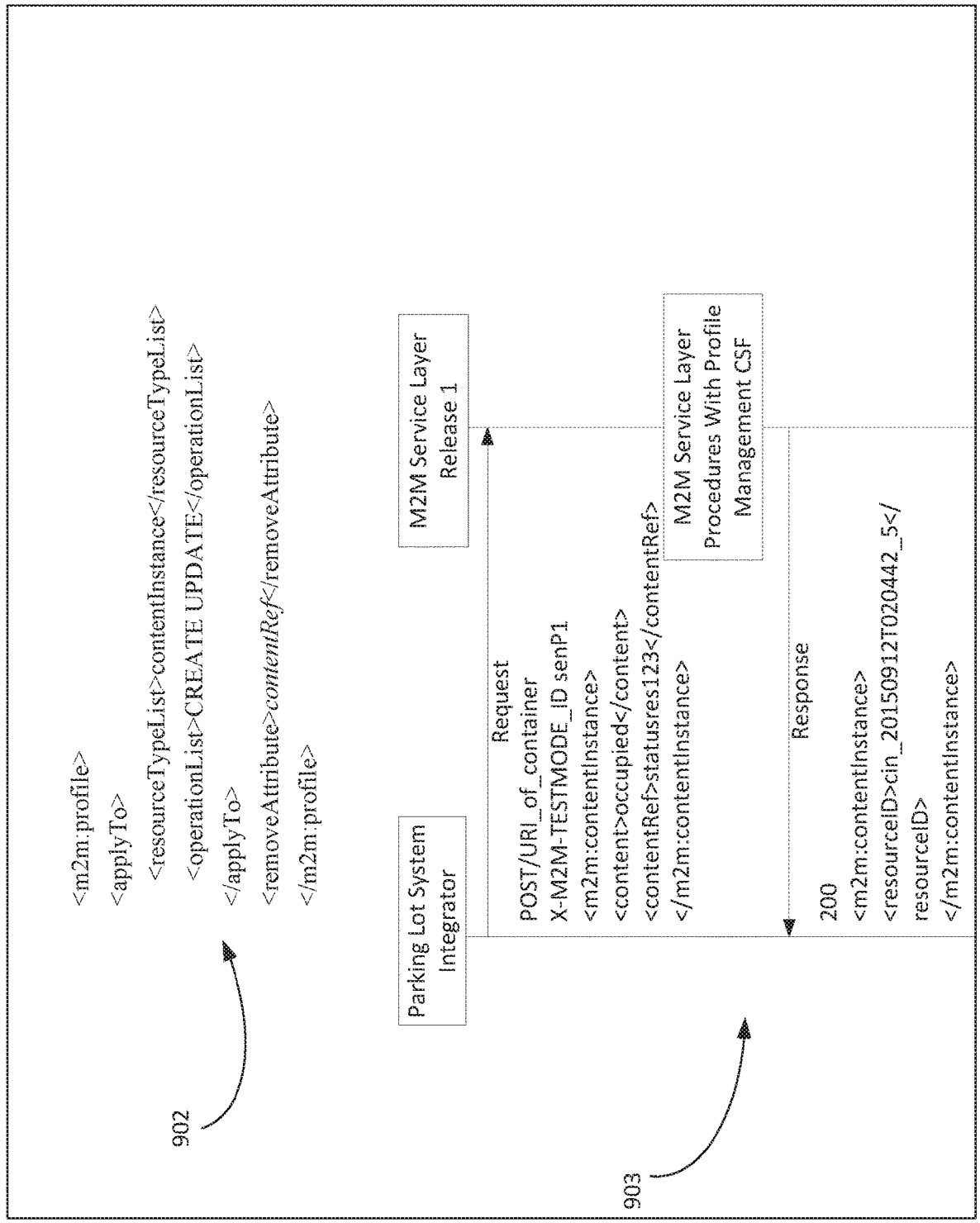
FIG. 19 illustrates an exemplary display (e.g., graphical user interface) that may be generated based on the methods and systems discussed herein.

FIG. 19 illustrates an exemplary display (e.g., graphical user interface) that may be generated based on the methods and systems discussed herein. Display interface 901 (e.g., touch screen display) may provide text in block 902 associated with profile based content and services, such as the parameters of Table 3 through Table 5. In another example, progress of any of the steps (e.g., sent messages or success of steps) discussed herein may be displayed in block 902. In addition, graphical output 903 may be displayed on display interface 901. Graphical output 903 may be the topology of the devices, a graphical output of the progress of any method or systems discussed herein, or the like.

Figure 20A:
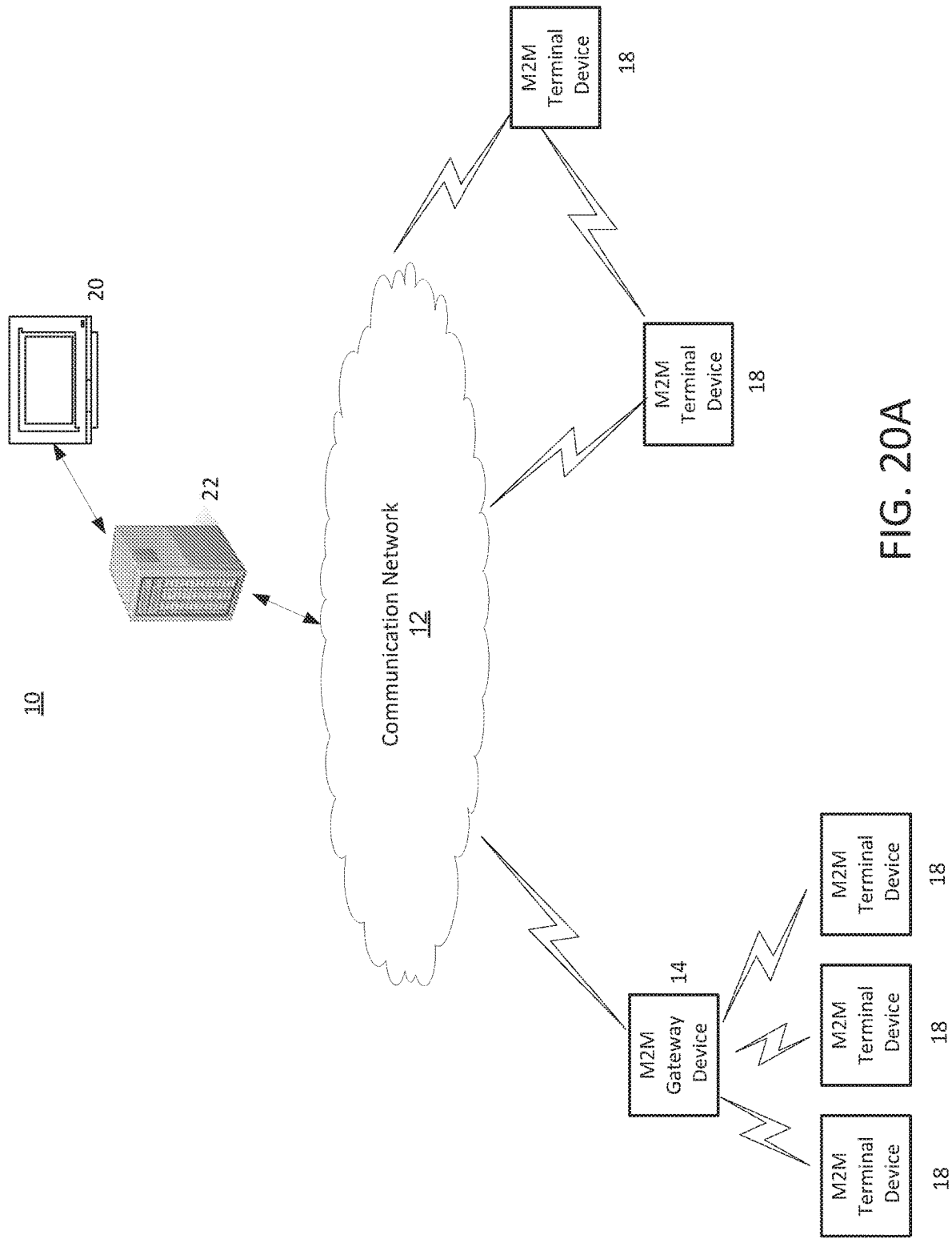
FIG. 20A illustrates an exemplary machine-to-machine (M2M) or Internet of Things (IoT) communication system in which the disclosed subject matter may be implemented.

FIG. 20A is a diagram of an example machine-to machine (M2M), Internet of Things (IoT), or Web of Things (WoT) communication system 10 in which one or more disclosed concepts associated with profile based content and services may be implemented (e.g., FIG. 9-FIG. 19 and associated discussion). Generally, M2M technologies provide building blocks for the IoT/WoT, and any M2M device, M2M gateway or M2M service platform may be a component of the IoT/WoT as well as an IoT/WoT service layer, etc.

As shown in FIG. 20A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 20A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Figure 20B:
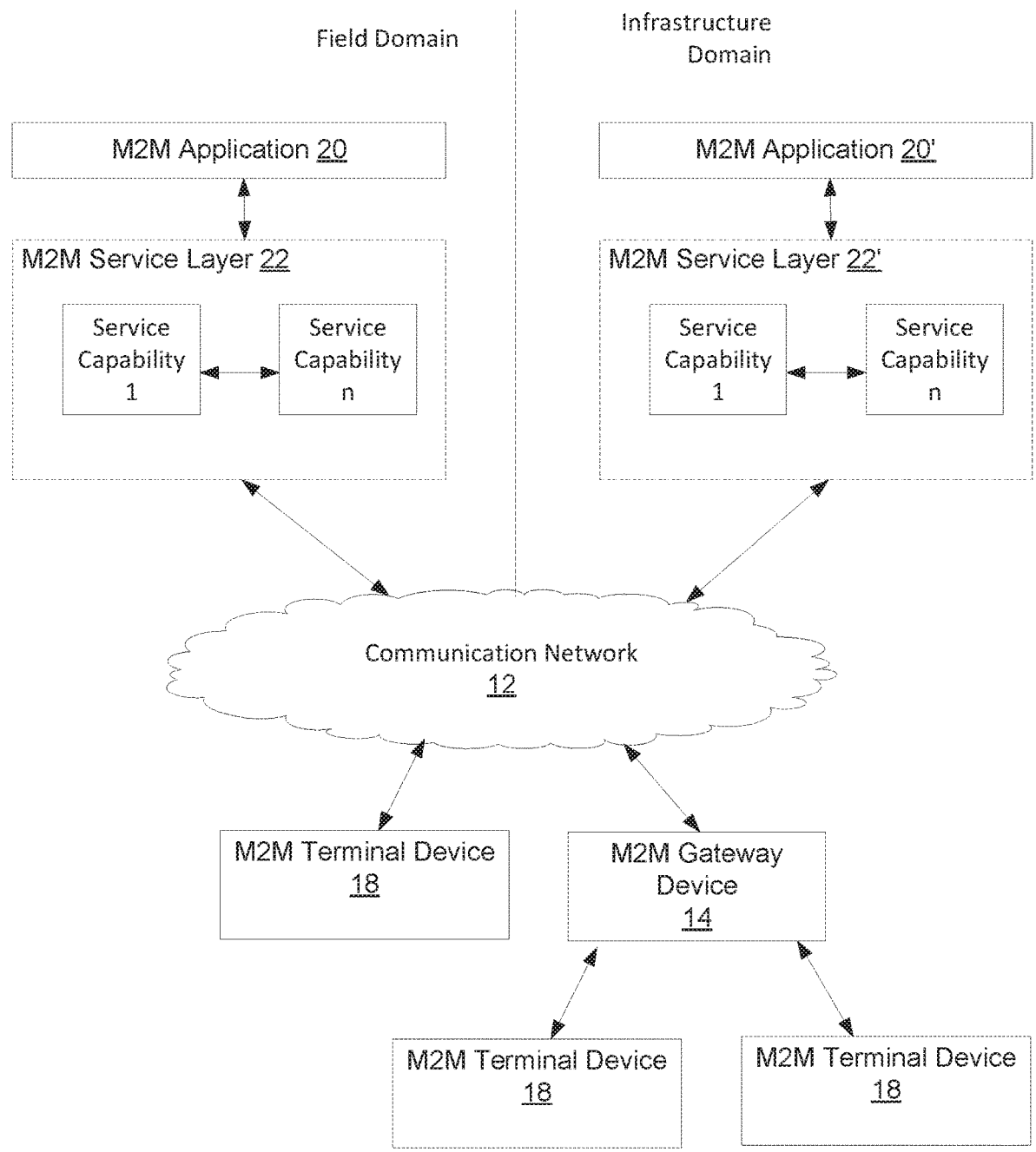
FIG. 20B illustrates an exemplary architecture that may be used within the M2M/IoT communications system illustrated in FIG. 20A.

Referring to FIG. 20B, the illustrated M2M service layer 22 (e.g., GW 111 with the service layer as described herein) in the field domain provides services for the M2M application 20 (e.g., parking space application 117), M2M gateway devices 14, and M2M terminal devices 18, and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 20B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using profile based content and services, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The profile based content and services system of the present application may be implemented as part of a service layer. The service layer is a middleware layer that supports value-added service capabilities through a set of application programming interfaces (APIs) and underlying networking interfaces. An M2M entity (e.g., an M2M functional entity such as a device, gateway, or service/platform that is implemented on hardware) may provide an application or service. Both ETSI M2M and oneM2M use a service layer that may include the profile based content and services of the present application. The oneM2M service layer supports a set of Common Service Functions (CSFs) (i.e., service capabilities). An instantiation of a set of one or more particular types of CSFs is referred to as a Common Services Entity (CSE), which can be hosted on different types of network nodes (e.g., infrastructure node, middle node, application-specific node). Further, the profile based content and services of the present application may be implemented as part of an M2M network that uses a Service Oriented Architecture (SOA) or a resource-oriented architecture (ROA) to access services such as the profile based content and services of the present application.

As disclosed herein, the service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications r various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware or software and that provides (service) capabilities or functionalities exposed to various applications or devices (i.e., functional interfaces between such functional entities) in order for them to use such capabilities or functionalities.

Figure 20C:
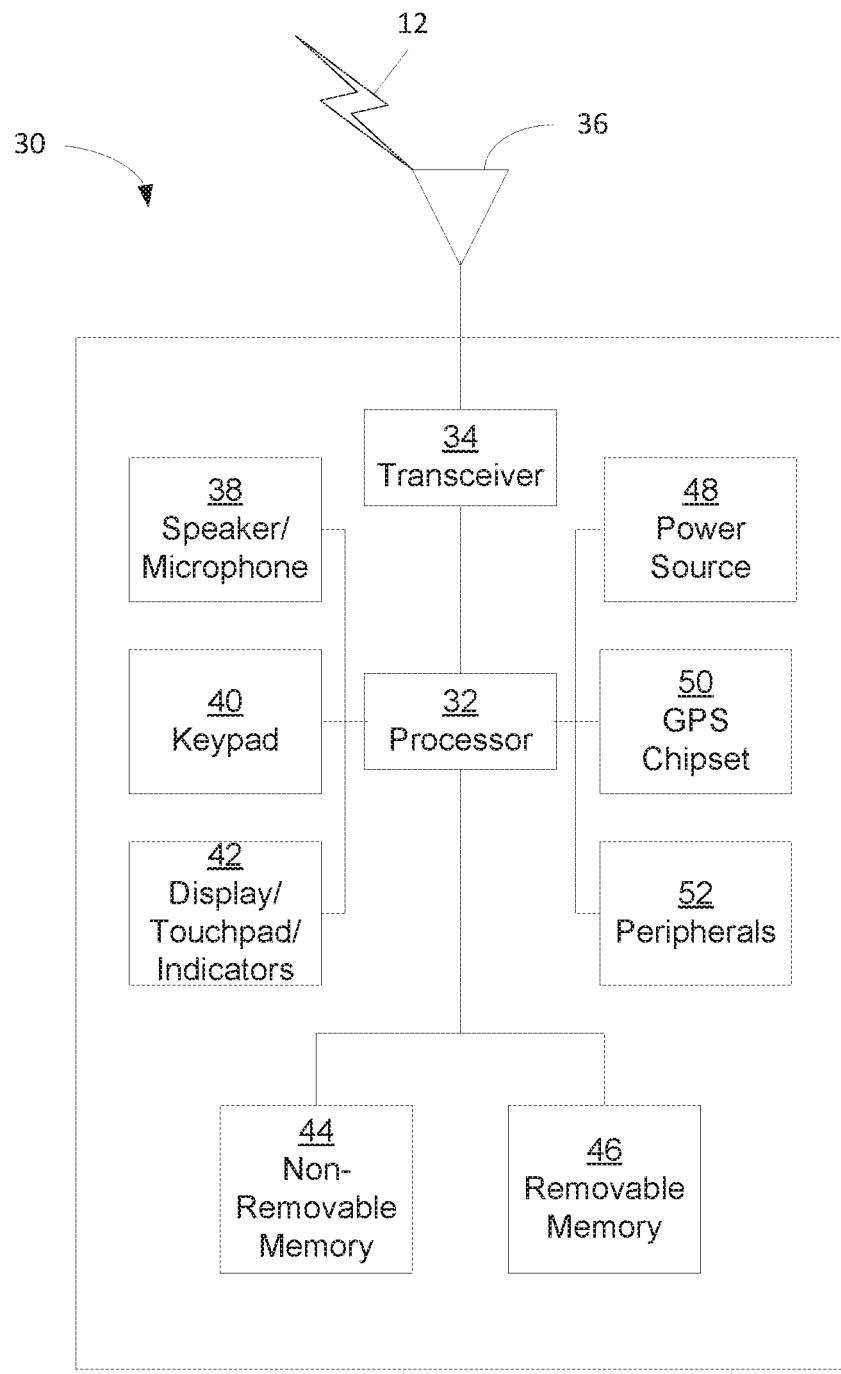
FIG. 20C illustrates an exemplary M2M/IoT terminal or gateway device that may be used within the communications system illustrated in FIG. 20A.

FIG. 20C is a system diagram of an example M2M device 30, such as an M2M terminal device 18 (which may include parking space application 117) or an M2M gateway device 14 (which may include one or more components of FIG. 13), for example. As shown in FIG. 20C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 (e.g., GW 111, client 126, client 125, and others) may be an exemplary implementation that performs the disclosed systems and methods for profile based content and services.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, or any other functionality that enables the M2M device 30 to operate in a wireless environment. The processor 32 may be coupled to the transceiver 34, which may be coupled to the transmit/receive element 36. While FIG. 20C depicts the processor 32 and the transceiver 34 as separate components, it will be appreciated that the processor 32 and the transceiver 34 may be integrated together in an electronic package or chip. The processor 32 may perform application-layer programs (e.g., browsers) or radio access-layer (RAN) programs or communications. The processor 32 may perform security operations such as authentication, security key agreement, or cryptographic operations, such as at the access-layer or application layer for example.

The transmit/receive element 36 may be configured to transmit signals to, or receive signals from, an M2M service platform 22. For example, the transmit/receive element 36 may be an antenna configured to transmit or receive RF signals. The transmit/receive element 36 may support various networks and air interfaces, such as WLAN, WPAN, cellular, and the like. In an example, the transmit/receive element 36 may be an emitter/detector configured to transmit or receive IR, UV, or visible light signals, for example. In yet another example, the transmit/receive element 36 may be configured to transmit and receive both RF and light signals. It will be appreciated that the transmit/receive element 36 may be configured to transmit or receive any combination of wireless or wired signals.

In addition, although the transmit/receive element 36 is depicted in FIG. 20C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the profile based content and services in some of the examples described herein are successful or unsuccessful (e.g., applying profiles or processing after rolling back the configuration etc.), or otherwise indicate a status of profile based content and services and associated components. The control lighting patterns, images, or colors on the display or indicators 42 may be reflective of the status of any of the method flows or components in the FIG.'s illustrated or discussed herein (e.g., FIG. 9-FIG. 20, etc). Disclosed herein are messages and procedures of profile based content and services. The messages and procedures can be extended to provide interface/API for users to request profile based content and services via an input source (e.g., speaker/microphone 38, keypad 40, or display/touchpad 42) and request, configure, or query profile based content and services, among other things that may be displayed on display 42.

The processor 32 may receive power from the power source 48, and may be configured to distribute or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with information disclosed herein.

The processor 32 may further be coupled with other peripherals 52, which may include one or more software or hardware modules that provide additional features, functionality or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The transmit/receive elements 36 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The transmit/receive elements 36 may connect to other components, modules, or systems of such apparatuses or devices via one or more interconnect interfaces, such as an interconnect interface that may comprise one of the peripherals 52.

Figure 20D:
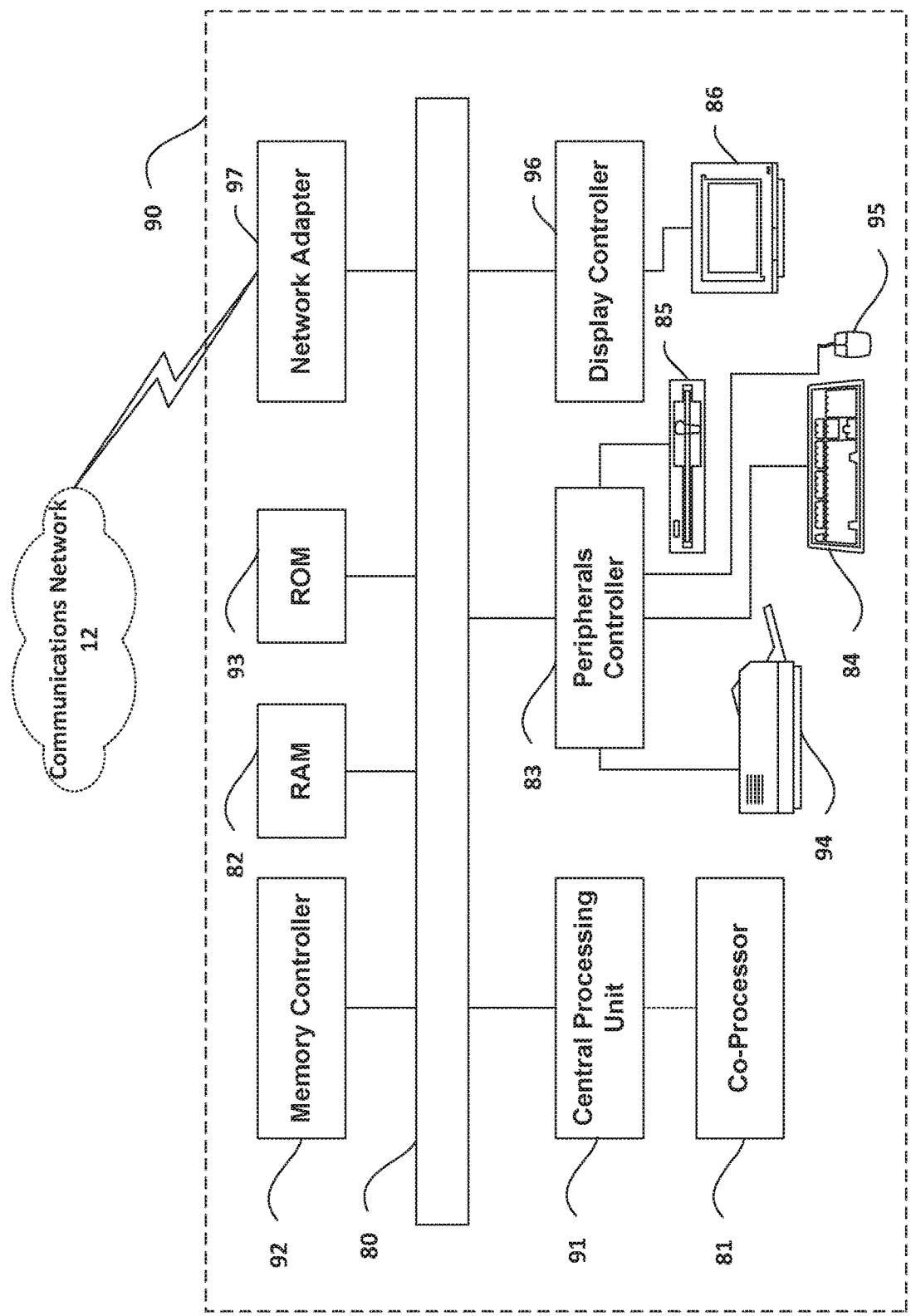
FIG. 20D illustrates an exemplary computing system in which aspects of the communication system of FIG. 20A may be embodied.

FIG. 20D is a block diagram of an exemplary computing system 90 on which, for example, the M2M service platform 22 of FIG. 20A and FIG. 20B may be implemented. Computing system 90 (e.g., M2M terminal device 18 or M2M gateway device 14) may comprise a computer or server and may be controlled primarily by computer readable instructions by whatever means such instructions are stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 or coprocessor 81 may receive, generate, and process data related to the disclosed systems and methods for profile based content and services, such as receiving error indications.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 can be read or changed by CPU 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may include peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include network adaptor 97 that may be used to connect computing system 90 to an external communications network, such as network 12 of FIG. 20A and FIG. 20B.

It is understood that any or all of the systems, methods and processes described herein may be embodied in the form of computer executable instructions (e.g., program code) stored on a computer-readable storage medium which instructions, when executed by a machine, such as a computer, server, M2M terminal device, M2M gateway device, or the like, perform or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals per se. As evident from the herein description, storage media should be construed to be statutory subject matter. Computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer. A computer-readable storage medium may have a computer program stored thereon, the computer program may be loadable into a data-processing unit and adapted to cause the data-processing unit to execute method steps when the computer program is run by the data-processing unit.

In describing preferred methods, systems, or apparatuses of the subject matter of the present disclosure—profile based content and services—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means for profile based content and services. A method, system, computer readable storage medium, or apparatus has means for receiving a message from a client device; determining a candidate list of profiles to apply the message, the candidate list of profiles associated with different versions of an implemented software; selecting a first profile out of the candidate list of profiles; and applying the first profile to the message. One or all of the candidate list of profiles may be applied based on any amount of matched information of the candidate list and a target end device for the message, such as the information listed in Table 1-Table 5. The message may be a service layer message. The determining of the candidate list of profiles may be based on matching information associated with the message from the client device to the profiles, the information associated with the message from the client device comprising an identifier of the client device. The determining of the candidate list of profiles may be based on matching information associated with the message from the client device to the profiles, the information associated with the message from the client device comprising a release of software indicated in the message. The determining of the candidate list of profiles may be based on matching information associated with the message from the client device to the profiles, the information associated with the message from the client device comprising a resource type indicated in the message. The determining of the candidate list of profiles may be based on matching information associated with the message from the client device to the profiles, the information associated with the message from the client device comprising an operation indicated in the message. The determining of the candidate list of profiles may be based on matching information associated with the message from the client device to the profiles, the information associated with the message from the client device comprising a uniform resource identifier indicated in the message. All combinations in this paragraph (including the removal or addition of steps) are contemplated in a manner that is consistent with the other portions of the detailed description.

Methods, systems, and apparatuses, among other things, has means for creating compatible messages between devices. Methods, systems, and apparatuses, among other things, has means for receiving a message from a client device for a target end device; determining a list of profiles to apply to the message, the list of profiles associated with multiple versions of an implemented software of the target end device; and applying the list of profiles to the message to create a new message that is compatible with the target end device. The message is a service layer message. The determining of the list of profiles may be based on matching information associated with the message from the client device to the list of profiles. The information associated with the message from the client device may include an identifier of the client device, a release of software indicated in the message, a resource type indicated in the message, an operation indicated in the message, or a uniform resource identifier indicated in the message. One or all of the list of profiles may be applied based on any amount of matched information of the candidate list and a target end device for the message, such as the information listed in Table 1-Table 5. All combinations in this paragraph (including the removal or addition of steps) are contemplated in a manner that is consistent with the other portions of the detailed description.

What is claimed:

1. An apparatus for creating compatible messages between devices, the apparatus comprising:
   a processor; and
   a memory coupled with the processor, the memory comprising executable instructions that when executed by the processor cause the processor to effectuate operations comprising:
   defining a plurality of profiles for modifying messages, wherein each respective profile of the plurality of profiles specifies which types of messages each respective profile applies to, the names of attributes in the message to be modified, and modifications to be performed on the attributes;
   receiving a message from a client device for a target end device;
   determining a list of profiles of the plurality of profiles to apply to the message, the list of profiles associated with multiple versions of an implemented software of the target end device; and applying the list of profiles to the message to create an updated or new message that is compatible with the target end device.

2. The apparatus of claim 1, wherein the message is a service layer message.

3. The apparatus of claim 1, wherein the determining of the list of profiles is based on matching information associated with the message from the client device to the list of profiles, the information associated with the message from the client device comprising an identifier of the client device.

4. The apparatus of claim 1, wherein the determining the list of profiles is based on matching information associated with the message from the client device to the list of profiles, the information associated with the message from the client device comprising a release of software indicated in the message.

5. The apparatus of claim 1, wherein the determining of the list of profiles is based on matching information associated with the message from the client device to the list of profiles, the information associated with the message from the client device comprising a resource type indicated in the message.

6. The apparatus of claim 1, wherein the determining of the list of profiles is based on matching information associated with the message from the client device to the list of profiles, the information associated with the message from the client device comprising an operation indicated in the message.

7. The apparatus of claim 1, wherein the determining of the list of profiles is based on matching information associated with the message from the client device to the list of profiles, the information associated with the message from the client device comprising a uniform resource identifier indicated in the message.

8. A method for creating compatible messages between devices, the method comprising:
defining a plurality of profiles for modifying messages, wherein each respective profile of the plurality of profiles specifies which types of messages each respective profile applies to, the names of attributes in the message to be modified, and modifications to be performed on the attributes;
receiving a message from a client device for a target end device;
determining a list of profiles of the plurality of profiles to apply to the message, the list of profiles associated with multiple versions of an implemented software of the target end device; and
applying the list of profiles to the message to create an updated or new message that is compatible with the target end device.

9. The method of claim 8, wherein the message is a service layer message.

10. The method of claim 8, wherein the determining of the list of profiles is based on matching information associated with the message from the client device to the list of profiles, the information associated with the message from the client device comprising an identifier of the client device.

11. The method of claim 8, wherein the determining the list of profiles is based on matching information associated with the message from the client device to the list of profiles, the information associated with the message from the client device comprising a release of software indicated in the message.

12. The method of claim 8, wherein the determining of the list of profiles is based on matching information associated with the message from the client device to the list of profiles, the information associated with the message from the client device comprising a resource type indicated in the message.

13. The method of claim 8, wherein the determining of the list of profiles is based on matching information associated with the message from the client device to the list of profiles, the information associated with the message from the client device comprising an operation indicated in the message.

14. The method of claim 8, wherein the determining of the list of profiles is based on matching information associated with the message from the client device to the list of profiles, the information associated with the message from the client device comprising a uniform resource identifier indicated in the message.

15. A non-transitory computer readable storage medium storing computer executable instructions that when executed by a computing device cause said computing device to effectuate operations comprising:
defining a plurality of profiles for modifying messages, wherein each respective profile of the plurality of profiles specifies which types of messages each respective profile applies to, the names of attributes in the message to be modified, and modifications to be performed on the attributes;
receiving a message from a client device for a target end device;
determining a list of profiles of the plurality of profiles to apply to the message, the list of profiles associated with multiple versions of an implemented software of the target end device; and
applying the list of profiles to the message to create an updated or new message that is compatible with the target end device.

16. The computer readable storage medium of claim 15, wherein the determining of the list of profiles is based on matching information associated with the message from the client device to the list of profiles, the information associated with the message from the client device comprising an identifier of the client device.

17. The computer readable storage medium of claim 15, wherein the determining the list of profiles is based on matching information associated with the message from the client device to the list of profiles, the information associated with the message from the client device comprising a release of software indicated in the message.

18. The computer readable storage medium of claim 15, wherein the determining of the list of profiles is based on matching information associated with the message from the client device to the list of profiles, the information associated with the message from the client device comprising a resource type indicated in the message.

19. The computer readable storage medium of claim 15, wherein the determining of the list of profiles is based on matching information associated with the message from the client device to the list of profiles, the information associated with the message from the client device comprising an operation indicated in the message.

20. The computer readable storage medium of claim 15, wherein the determining of the list of profiles is based on matching information associated with the message from the client device to the list of profiles, the information associated with the message from the client device comprising a uniform resource identifier indicated in the message.

* * * * *